(12) United States Patent
Taniguchi et al.

(10) Patent No.: US 7,002,653 B2
(45) Date of Patent: Feb. 21, 2006

(54) LIQUID CRYSTAL DISPLAY APPARATUS AND PRODUCTION METHOD OF SAME

(75) Inventors: Koji Taniguchi, Nara (JP); Noriko Watanabe, Nara (JP); Shigeaki Mizushima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 149 days.

(21) Appl. No.: 09/997,079

(22) Filed: Nov. 27, 2001

(65) Prior Publication Data

US 2002/0071080 A1   Jun. 13, 2002

(30) Foreign Application Priority Data

| Nov. 28, 2000 | (JP) | ............................. 2000-361977 |
| Sep. 19, 2001 | (JP) | ............................. 2001-285857 |

(51) Int. Cl.
    *G02F 1/1343*   (2006.01)
(52) U.S. Cl. ..................... 349/138; 349/130; 349/139; 349/143
(58) Field of Classification Search ................ 349/138, 349/130, 143
    See application file for complete search history.

(56) References Cited

U.S. PATENT DOCUMENTS

| 5,608,556 | A * | 3/1997 | Koma ........................ 349/143 |
| 6,573,964 | B1 * | 6/2003 | Takizawa et al. ............ 349/129 |
| 6,724,452 | B1 * | 4/2004 | Takeda et al. ............... 349/139 |
| 2001/0020992 | A1 * | 9/2001 | Takeda et al. ............... 349/130 |
| 2001/0040546 | A1 * | 11/2001 | Ohmuro et al. ................ 345/87 |
| 2002/0063826 | A1 * | 5/2002 | Okamoto et al. ............ 349/117 |
| 2005/0179848 | A1 * | 8/2005 | Song et al. .................. 349/143 |

FOREIGN PATENT DOCUMENTS

| EP | 0884626 A2 | 12/1998 |
| JP | 2-191914 | * 7/1990 |
| JP | 02-191914 | 7/1990 |
| JP | 06-194656 | 7/1994 |
| JP | 07-199193 | 8/1995 |
| JP | 11-242225 | 9/1999 |

* cited by examiner

Primary Examiner—Nathan J. Flynn
Assistant Examiner—Ahmed N. Sefer
(74) Attorney, Agent, or Firm—David G. Conlin; David A. Tucker; Edwards Angell Palmer & Dodge LLP

(57) ABSTRACT

A liquid crystal display apparatus comprises a pair of substrates, and a liquid crystal layer having negative dielectric anisotropy sandwiched by the pair of substrates. Electrodes are provided on each of the pair of substrates, each pixel being defined by an electrode on one of the pair of substrate and a corresponding electrode on the other of the pair of substrates. Each of the electrodes provided on at least one of the pair of substrates has at least first and second tilted surfaces facing directions different from a direction substantially perpendicular to the substrate surface and being adjacent to each other. An insulating film is provided on a liquid crystal molecule side of the electrodes provided on the at least one of the pair of substrates to bury the tilted surfaces of the electrodes to produce a flat surface of the at least one of the pair of substrates.

14 Claims, 18 Drawing Sheets

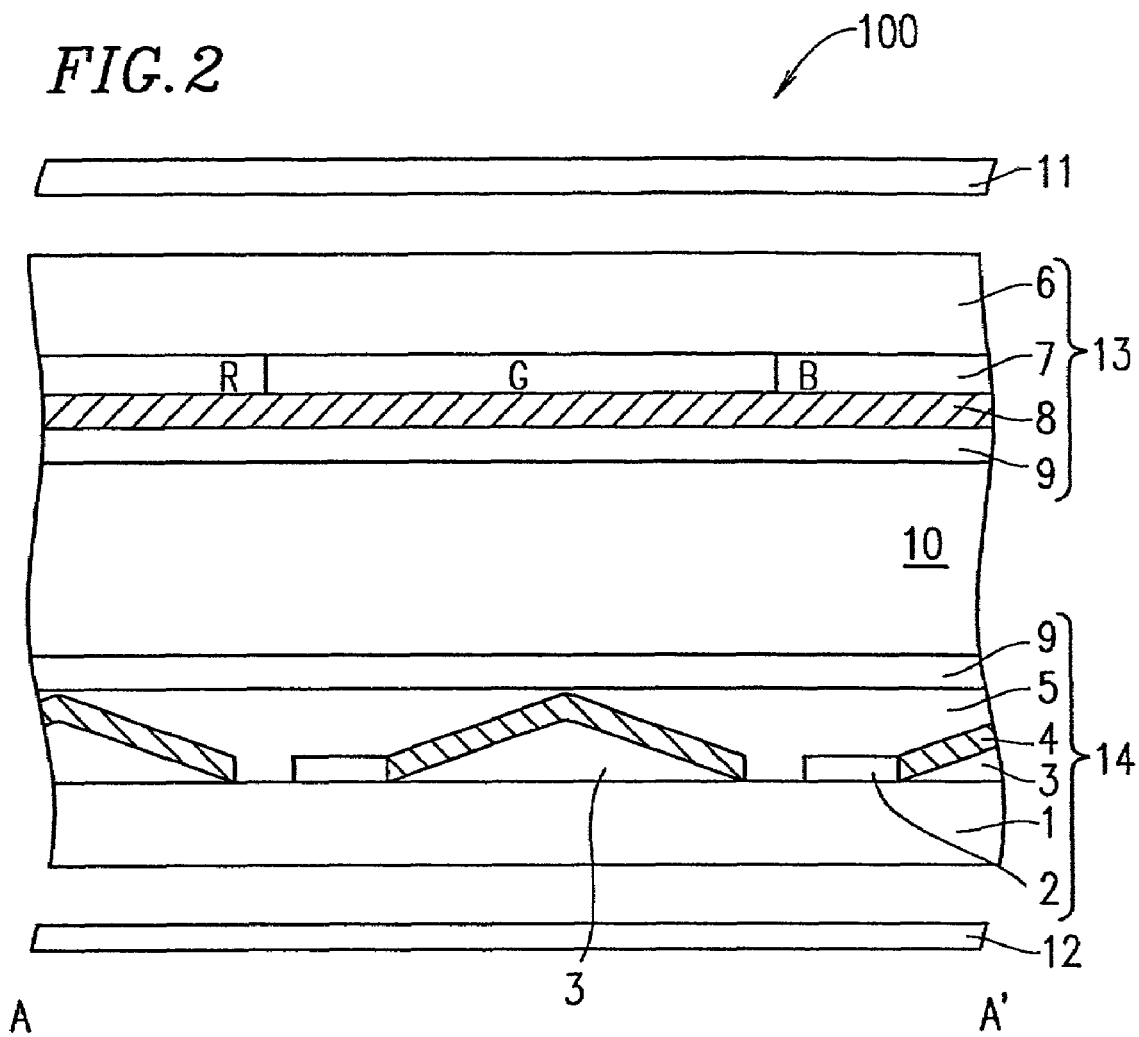

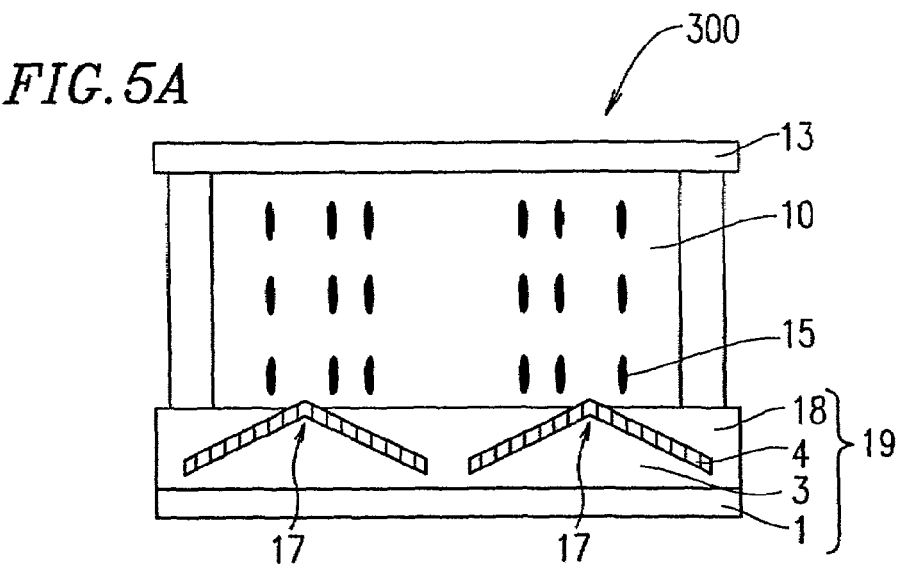
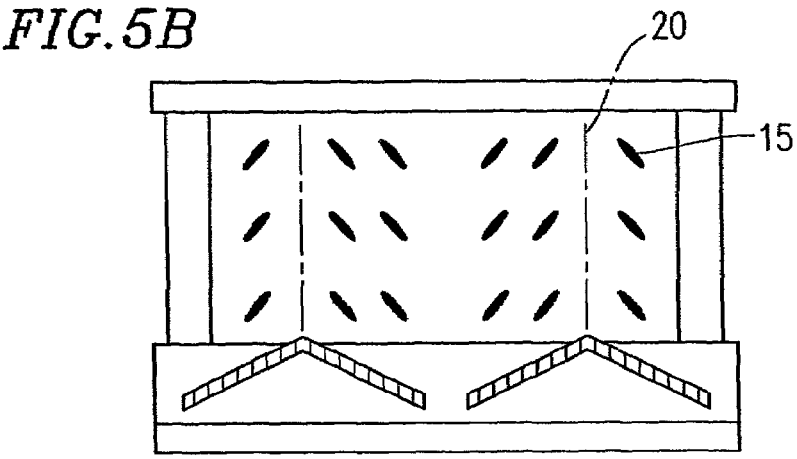
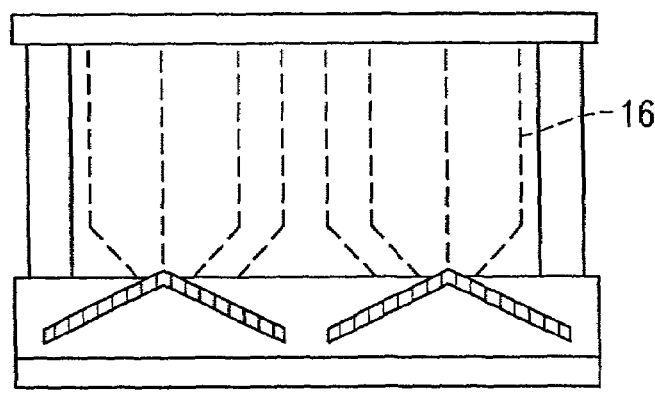

LIQUID CRYSTAL DISPLAY APPARATUS AND PRODUCTION METHOD OF SAME

BACKGROUND OF THE INVENTION

1. Field of the Invention

The present invention relates to a liquid crystal display apparatus in which alignment division is utilized in a vertical alignment mode to provide a large viewing angle, and a method for producing such a liquid crystal display apparatus.

2. Description of the Related Art

Recently, as office automation equipment, such as personal computers, is becoming more portable, there is an increasing demand for flat-panel display apparatuses. An effort has been made to reduce the costs of such display apparatuses. Examples of flat-panel display apparatuses include a liquid crystal display apparatus (hereinafter also referred to as an LCD), an electroluminescent display apparatus, a plasma display apparatus, and an electrochromic display apparatus. In a LCD, a transmission medium (i.e., liquid crystal) is sandwiched between a pair of substrates on which electrodes are provided. Display is performed by applying a voltage across the substrates to control the electro-optical characteristics of the medium. LCDs are capable of displaying with low power consumption and therefore, has been more widely used.

Display modes and driving methods of LCDs will be described below. Passive matrix LCDs, which utilize super twisted nematic (STN) liquid crystal, can be produced at low cost. However, for passive matrix LCDs, it is difficult to achieve high resolution, high contrast, multiple tones (multicolor or full color) and a large viewing angle.

To overcome the drawbacks of passive matrix LCDS, active matrix LCDs have been proposed in which a switching element (active element) is provided for each pixel so that the number of scanning electrodes can be increased. Such LCDs are on the way to higher resolution, higher contrast, more multiple tones and a larger viewing angle. In active matrix LCDs, each of pixel electrodes arranged in a matrix is electrically connected via an active element to a scanning line passing in the vicinity of the pixel. Examples of the active element includes a two-terminal nonlinear element and a three-terminal nonlinear element. A thin film transistor (TFT), which is a three-terminal element, is a representative active element which is currently used in active matrix LCDs.

A configuration of a conventional LCD will be described below. For example, a voltage-controlled birefringence LCD comprising nematic liquid crystals having negative dielectric anisotropy and a vertical alignment film (hereinafter referred to as a "vertical alignment LCD") will be described. In LCDs of this type, the transmittance of liquid crystals is controlled by utilizing a difference in refractive index (birefringence) between the major and minor axes of a liquid crystal molecule.

In vertical alignment LCDs, a vertical alignment film is used to cause liquid crystal molecules to be arranged so that the major axis direction of each liquid crystal molecule is oriented in a direction substantially perpendicular to a substrate surface in the absence of an applied voltage across the electrodes provided on opposite sides of a liquid crystal layer. Therefore, incident polarized light, which has penetrated through one of a pair of polarizers orthogonally arranged, passes through the liquid crystal layer without elliptical polarization due to birefringence and therefore cannot penetrate through the other polarizer. In this case, LCDs are in the state of black display. In the presence of an applied voltage across the electrodes provided on opposite sides of the liquid crystal layer, the major axis of the liquid crystal molecule is tilted toward the substrate surface in response to an applied voltage. Therefore, incident polarized light, which has penetrated through one of a pair of polarizers orthogonal arranged, is elliptically polarized due to birefringence in the liquid crystal layer. If a phase velocity difference (retardation) between an ordinary light component and an extraordinary light component in liquid crystals is controlled by adjusting the strength of an electric field in the liquid crystal layer, the transmittance of light outgoing from the other polarizer can be arbitrarily changed. In this case, as an applied voltage is increased from zero, display is changed from black to white.

FIG. 13 is a cross-sectional view showing a schematic configuration of a conventional LCD. This LCD comprises an element substrate 54 and a counter substrate 53. In the substrate 54, three-terminal nonlinear elements 42, such as TFT, and pixel electrodes 44 made of ITO (Indium Tin Oxide) or the like connected to the drains of the elements 42 are provided on a glass substrate 41. In the counter substrate 53, a color filter 47 and counter electrodes 48 made of ITO or the like are provided on a glass substrate 46. Each of the substrates 53 and 54 further comprises a vertical alignment film 49 provided on an inner surface thereof for aligning liquid crystal molecules. A liquid crystal layer 50 having negative dielectric anisotropy is sandwiched between the vertical alignment films 49. Further, polarizers 51 and 52 are provided on an outer surface of the substrates 53 and 54, respectively.

FIGS. 14A to 14C are cross-sectional views for explaining an alignment of liquid crystal molecules in the conventional LCD. As shown in FIG. 14A, in this LCD, liquid crystal molecules 55 in the liquid crystal layer 50 are oriented in a direction substantially perpendicular to the substrates 53 and 54 in the absence of an applied voltage. The liquid crystal molecules 55 are oriented in a direction substantially parallel to the substrates 53 and 54 in the presence of an applied voltage having a predetermined value. As shown in FIG. 14B, if a voltage having a value less than the predetermined value is applied across the liquid crystal layer 50, the liquid crystal molecules 55 are oriented in a direction tilted with respect to the substrates 53 and 54. Thus, rotation or birefringence of light in the liquid crystal layer 50 can be controlled by changing an applied voltage, whereby the transmittance of the light can be arbitrarily changed, i.e., an image can be created. In other words, the orientations of liquid crystal molecules are changed to control retardation, thereby regulating the intensity of transmitted light. In this case, as shown in FIG. 14C, electric lines of force 56 substantially perpendicular to the substrates 53 and 54 are generated between the substrates 53 and 54.

In LCDs of this type, conventionally, protrusions may be provided on the substrate 53 or 54 so as to regulate the orientations of liquid crystal molecules (such protrusions are called domain regulating means).

For example, Japanese Laid-Open Publication No. 2-191914 discloses a liquid crystal electro-optical device as shown in FIGS. 15A to 17B. FIGS. 15A to 17B are diagrams for explaining the orientations of liquid crystal molecules in the presence of an applied voltage. FIG. 16 is a plan view showing a configuration of elements on a substrate of a general LCD. Referring to FIG. 15A, this liquid crystal electro-optical device comprises a counter substrate 113, an element substrate 114, and a liquid crystal layer 110. The element substrate 114 comprises a glass substrate 101, tilted protrusions 103, pixel electrodes 104, and an overcoat layer 105. The protrusions 103 are tilted in substantially the same direction (rightward in the figures). The pixel electrodes 104 are provided on the protrusions 103, so that the pixel electrodes 104 are also tilted in substantially the same direction. Therefore, as shown in FIG. 15C, all electric lines of force 116 in the vicinity of the element substrate 114 have the same tilted direction. With this structure, as shown in FIG. 15B, when a voltage less than a predetermined voltage, which causes liquid crystal molecules 115 in the liquid crystal layer 110 to be substantially parallel to the element substrate 114, is applied between the pixel electrodes 104 and counter electrodes (not shown) on the counter substrate 113, the liquid crystal molecule 115 can be oriented in substantially the same direction. A surface of the element substrate 114 can be made flat with the overcoat layer 105 provided on the pixel electrodes 104. In this case, however, since the liquid crystal molecules 115 are tilted in substantially the same direction, retardation is changed in a relative manner depending on a viewing angle at which a viewer sees a display screen. In other words, the intensity of transmitted light or hue varies depending on a viewing angle, i.e., a so-called viewing angle dependence problem remains.

Further, in the liquid crystal electro-optical device, as shown in FIG. 16, bus lines (electrode line), such as source lines 117 and gate lines 118, are provided in the vicinity of the pixel electrodes 104. An electric field is generated between the bus lines 117, 118 and the pixel electrodes 104. As a result, as shown in FIG. 17A which is a cross-sectional view of FIG. 16 taken along line G–G', not all the electric lines of force 116 are tilted in the single predetermined direction. Therefore, it is easily inferred that as shown in FIG. 17B, the liquid crystal molecules 115 on a surface of the pixel electrodes 104 are not uniformly oriented, whereby irregular orientation occurs especially in the vicinity of the ends of the pixel electrodes 104.

Alternatively, protrusions 67 as shown in FIG. 18A may be provided on an element substrate 64 comprising electrodes. A vertical alignment film is applied on the protrusions 67. Liquid crystal molecules 65 in a liquid crystal layer 60 are tilted in predetermined directions by utilizing tilted surfaces of the protrusions 67 on the element substrate 64, thereby regulating the orientations of the liquid crystal molecules 65. In this case, however, a distance between the element substrate 64 and a counter substrate 63, i.e., a thickness of a portion of the liquid crystal layer 60 between pixel electrodes, is not uniform.

Japanese Laid-Open Publication No. 11-242225 and Japanese Laid-Open Publication No. 7-199193 disclose another type of LCD. As shown in FIG. 18B, protrusions 77 and 78 are provided on substrates 74 and 73, respectively, in a staggered manner. Liquid crystal molecules 75 on a surface of the protrusions 77 provided on the substrate 74 and on a surface of the protrusions 78 provided on the substrate 73 are tilted in predetermined directions by utilizing tilted surfaces of the protrusions 77 and 78, thereby strictly regulating the orientations of the liquid crystal molecules 75 in the liquid crystal layer 70. In this case, however, the substrates 73 and 74 have to be attached to each other with high precision in order to arrange the protrusions 77 and 78 on the substrates 73 and 74 in staggered and equally-spaced manners.

Japanese Laid-Open Publication No. 6-194656 discloses an LCD of a still another type, in which as shown in FIG. 18C, grooves 89 and 90 are respectively provided in a staggered manner on pixel electrodes 84 and counter electrodes 88 on respective substrates 94 and 93. Electric lines of force 86 are bent in the vicinity of the grooves 89 and 90 on surfaces of the substrates 94 and 93, thereby regulating the orientations of liquid crystal molecules 85 in a liquid crystal layer 80. Also in this case, however, the distance between the substrates 93 and 94 sandwiching liquid crystal is not uniform and the substrates 93 and 94 have to be attached with high precision.

As described above, in LCDs, rotation or birefringence of light in a liquid crystal layer can be controlled by changing an applied voltage, whereby the transmittance of the light can be arbitrarily changed, i.e., an intended image can be created. In other words, the orientations of liquid crystal molecules are changed to control retardation, thereby making it possible to regulate the intensity of transmitted light.

The retardation varies depending on an angle between the major axis of a liquid crystal molecule and the direction of an electric field. Therefore, as disclosed in Japanese Laid-Open Publication No. 2-191914, even if the angle between the major axis of a liquid crystal molecule and the direction of an electric field is controlled in one-dimensional manner by regulating the intensity of the electric field, retardation varies in a relative manner depending on a viewing angle at which a viewer sees a display screen, so that the intensity or hue of transmitted light is also changed, i.e., a so-called viewing angle dependence problem arises. In this case, liquid crystal molecules on pixel electrodes are not uniformly oriented in a predetermined direction, so that irregular orientation occurs especially in the vicinity of the ends of the pixel electrodes.

According to the techniques shown in FIGS. 18A to 18C, the viewing angle dependence problem can be substantially solved. In this case, the distance between substrates sandwiching liquid crystal is not uniform and the substrates have to be attached with high precision.

Further, according to the techniques shown in FIGS. 18A and 18B, an interface (alignment film on electrodes) between a liquid crystal layer and each substrate is in a pit-and-protrusion shape. Therefore, in vertical alignment LCDs, liquid crystal molecules in the vicinity of the alignment film are oriented in directions substantially perpendicular to the pit-and-protrusion shaped alignment film in the absence of an applied voltage. As a result, the liquid crystal molecules are tilted away from directions substantially perpendicular to the substrates by angles corresponding to tilt angles of the pit-and-protrusion shape. Therefore, satisfactory black display is not obtained in a direction substantially perpendicular to the substrates, so that a contrast of a displayed image is significantly reduced.

SUMMARY OF THE INVENTION

According to an aspect of the present invention, a liquid crystal display apparatus comprises a pair of substrates, and a liquid crystal layer having negative dielectric anisotropy sandwiched by the pair of substrates. Electrodes are provided on each of the pair of substrates, each pixel being defined by an electrode on one of the pair of substrate and a corresponding electrode on the other of the pair of substrates. Liquid crystal molecules in the liquid crystal layer are oriented in a direction substantially perpendicular to a substrate surface in the absence of an applied voltage, are oriented in a direction substantially parallel to the substrate surface in the presence of an applied predetermined voltage, and are oriented in a slanting direction with respect to the substrate surface in the presence of an applied voltage less than the predetermined voltage. Each of the electrodes provided on at least one of the pair of substrates has at least first and second tilted surfaces facing directions different from a direction substantially perpendicular to the substrate surface and being adjacent to each other. An insulating film is provided on a liquid crystal molecule side of the electrodes provided on the at least one of the pair of substrates to bury the tilted surfaces of the electrodes to produce a flat surface of the at least one of the pair of substrates.

In one embodiment of this invention, another insulating film comprising predetermined protrusions, pits, or a pit-and-protrusion pattern having at least first and second tilted surfaces are provided on a liquid crystal layer side of the at least one of the pair of substrates so that the electrodes provided on the at least one of the pair of substrates are provided on the other insulating film while the first and second tilted surfaces of the other insulating film are maintained.

In one embodiment of this invention, the first and second tilted surfaces of each of the electrodes provided on the at least one of the pair of substrates are provided for a corresponding pixel, and liquid crystal molecules in the corresponding pixel are tilted in directions different from a direction substantially perpendicular to the substrate surface, the directions being separated by a boundary between the first and second tilted surfaces.

In one embodiment of this invention, the other insulating film also serves as a vertical alignment film provided by subjecting surfaces of the pair of substrates to vertical alignment treatment.

In one embodiment of this invention, each of the electrodes provided on the at least one of the pair of substrates further has at least third and fourth tilted surfaces adjacent to each other and facing directions different from the directions of the first and second tilted surfaces and the direction substantially perpendicular to the substrate surface. A boundary between the first and second tilted surfaces and a boundary between the third and fourth tilted surfaces are oriented to directions different from each other in a plane parallel to the substrate surface.

In one embodiment of this invention, the first and second tilted surfaces of each of the electrodes provided on the at least one of the pair of substrates are adjacent to each other to form a protrusion, an apex portion of the protrusion facing the liquid crystal layer, and a boundary between the first and second tilted surfaces are exposed from the insulating film to the liquid crystal layer.

According to another aspect of the present invention, a method is provided for producing a liquid crystal display apparatus comprising a pair of substrates and a liquid crystal layer having negative dielectric anisotropy sandwiched by the pair of substrates, in which electrodes are provided on each of the pair of substrates, each pixel being defined by an electrode on one of the pair of substrate and a corresponding electrode on the other of the pair of substrate, and liquid crystal molecules in the liquid crystal layer are oriented in a direction substantially perpendicular to a substrate surface in the absence of an applied voltage, are oriented in a direction substantially parallel to the substrate surface in the presence of an applied predetermined voltage, and are oriented in a slanting direction with respect to the substrate surface in the presence of an applied voltage less than the predetermined voltage. In production of one of the pair of substrates, which is an active matrix substrate, the method comprises the step of forming a plurality of active elements and a plurality of electrode lines on the one of the pair of substrates, forming a conductive film on the resultant substrate, and subjecting the conductive film to patterning, thereby providing the pixel electrodes on the one of the pair of substrates, in which each of the pixel electrodes has at least first and second tilted surfaces facing directions different from a direction substantially perpendicular to the substrate surface and being adjacent to each other, and is connected to electrodes of the active elements, and forming an insulating film on the pixel electrodes to bury the first and second tilted surfaces of the pixel electrodes to produce a flat surface of the one of the pair of substrates.

According to another aspect of the present invention, a method is provided for producing a liquid crystal display apparatus comprising a pair of substrates and a liquid crystal layer having negative dielectric anisotropy sandwiched by the pair of substrates, in which electrodes are provided on each of the pair of substrates, each pixel being defined by an electrode on one of the pair of substrate and a corresponding electrode on the other of the pair of substrate, and liquid crystal molecules in the liquid crystal layer are oriented in a direction substantially perpendicular to a substrate surface in the absence of an applied voltage, are oriented in a direction substantially parallel to the substrate surface in the presence of an applied predetermined voltage, and are oriented in a slanting direction with respect to the substrate surface in the presence of an applied voltage less than the predetermined voltage. In production of one of the pair of substrates, which is an active matrix substrate, the method comprises the step of forming a plurality of active elements and a plurality of electrode lines on the one of the pair of substrates, forming a first insulating film on the resultant substrate, and subjecting the first insulating film to patterning, thereby providing predetermined protrusions, pits, or a pit-and-protrusion pattern having at least first and second tilted surfaces facing directions on a liquid crystal layer side of the resultant substrate, while forming contact holes in the first insulating film, forming a conductive film on the first insulating film in which the first and second tilted surfaces of the first insulating film are maintained, patterning the conductive film in such a manner as to overlap the active elements and the electrode lines and to be connected to electrodes of the active elements, thereby forming the pixel electrodes, and forming a second insulating film on the pixel electrodes to bury the first and second tilted surfaces of the pixel electrodes to produce a flat surface of the one of the pair of substrates.

Hereinafter, functions of the present invention will be described.

In the present invention, electrodes are provided on at least one of a pair of substrates, which have at least first and second tilted surfaces adjacent to each other and facing different directions with respect to the substrates. The electrodes serve as domain regulating means for regulating the alignment of liquid crystal molecules to be oriented in a direction slanting to the substrates. Therefore, as described later in Examples 1 to 5, electric lines of force generated in the vicinity of an interface between a liquid crystal layer and the substrate is oriented to a direction substantially perpendicular to the tilted surfaces of the electrodes, and liquid crystal molecules in pixels are oriented to different directions separated by boundaries between the tilted surfaces. Further, in the liquid crystal layer, an electric field effect emerges more significantly in a portion close to the electrodes than a portion at a middle between the substrates. Liquid crystal molecules in the middle portion between the substrates are tilted by following tilted directions of liquid crystal molecules regulated by the tilted surfaces of the electrodes. As a result, the so-called viewing angle dependence problem that the intensity of transmitted light or hue is changed depending on a viewing angle can be avoided.

Further, an insulating film (referred to as a second insulating film in the examples) is provided on a liquid crystal layer side of a substrate on which electrodes having tilted surfaces are provided, so that a surface of the substrate contacting the liquid crystal layer can be made flat. Therefore, it is possible to avoid the problem that the distance between substrates sandwiching the liquid crystal layer is not uniform. In addition, it is possible to obtain satisfactory black display viewed in a direction substantially perpendicular to the substrate in the absence of an applied voltage.

If a set of tilted surfaces are provided across two or more pixels, viewing angle dependence varies from pixel to pixel, thereby making it difficult to obtain satisfactory display. Therefore, a set of tilted surfaces facing two or more directions are preferably provided for each pixel.

To provide tilted surfaces for electrodes, for example, as described later in Examples 1 to 4, protrusions, an insulating film (first insulating film in the examples) comprising protrusions, pits, or a pit-and-protrusions pattern having at least first and second tilted surfaces may be provided on a substrate so that the shapes of the tilted surface are maintained. Such predetermined protrusions, pits, or a pit-and-protrusions pattern having tilted surfaces may be provided on a counter substrate as shown in Example 4 below. In the present invention, when tilted surfaces are provided on both substrates, the attachment precision problem also arises. In this case, the problem that the distance between substrates is not uniform does not arise.

In Example 2 below, the first insulating film may serve as an insulating protection film when pixel electrodes, and active elements and electrode lines overlap each other in order to increase an aperture area. Further, in this case, since the pixel electrodes overlap bus lines, there is substantially no influence of the bus lines on the alignment of the liquid crystals, whereby irregular orientation in the vicinity of ends of pixel electrodes can be prevented.

Furthermore, as shown in Example 5 below, electrodes themselves may be in the shape of protrusions having tilted surfaces. Thus, similar to Examples 1 to 4 below, a first insulating film is not required, thereby making it possible to simplify the fabrication processes of an LCD.

Tilted surfaces of electrodes form protrusions at boundaries between the tilted surfaces, and the boundaries are exposed from a second insulating film. Therefore, as shown in Example 3, a force regulating the alignment of liquid crystal molecules in the presence of an applied voltage is further enhanced, whereby the boundaries between alignments can be made clearer.

The second insulating film may also serve as a vertical alignment film if the second insulating film can bury the tilted surfaces of the electrodes to form a flat surface with respect to a substrate surface. Therefore, an additional vertical alignment film is not required, thereby making it possible to simplify the fabrication processes of LCDs.

Further, third and fourth tilted surfaces facing different directions from those of the first and second tilted surfaces may be provided on a liquid crystal layer side surface of a substrate so that a boundary between the first and second tilted surface is oriented to a direction different from that of a boundary between the third and fourth tilted surfaces in a plane parallel to a substrate surface. Therefore, a domain regulating means for regulating the alignment of liquid crystal molecules into a required direction can be obtained.

Thus, the invention described herein makes possible the advantages of providing (1) a LCD in which there is substantially no viewing angle dependence problem, irregular orientation in the vicinity of ends of electrodes can be prevented, the distance between substrates sandwiching liquid crystal is substantially uniform, attachment of the substrates does not require high precision, and satisfactory black display can be obtained in a direction substantially perpendicular to the substrates, and (2) a method for producing the LCD.

These and other advantages of the present invention will become apparent to those skilled in the art upon reading and understanding the following detailed description with reference to the accompanying figures.

BRIEF DESCRIPTION OF THE DRAWINGS

FIG. 2 is a cross-sectional view of the LCD shown in FIG. 1 taken along line A–A'.

FIGS. 5A to 5C are cross-sectional views for explaining domain regulation of an LCD 300 according to Example 3 of the present invention, in which orientations of liquid crystal molecules are regulated into slanting directions in the presence of an applied voltage.

DESCRIPTION OF THE PREFERRED EMBODIMENTS

Hereinafter, the present invention will be described by way of illustrative examples with reference to the accompanying drawings.

EXAMPLE 1

Figure 1:
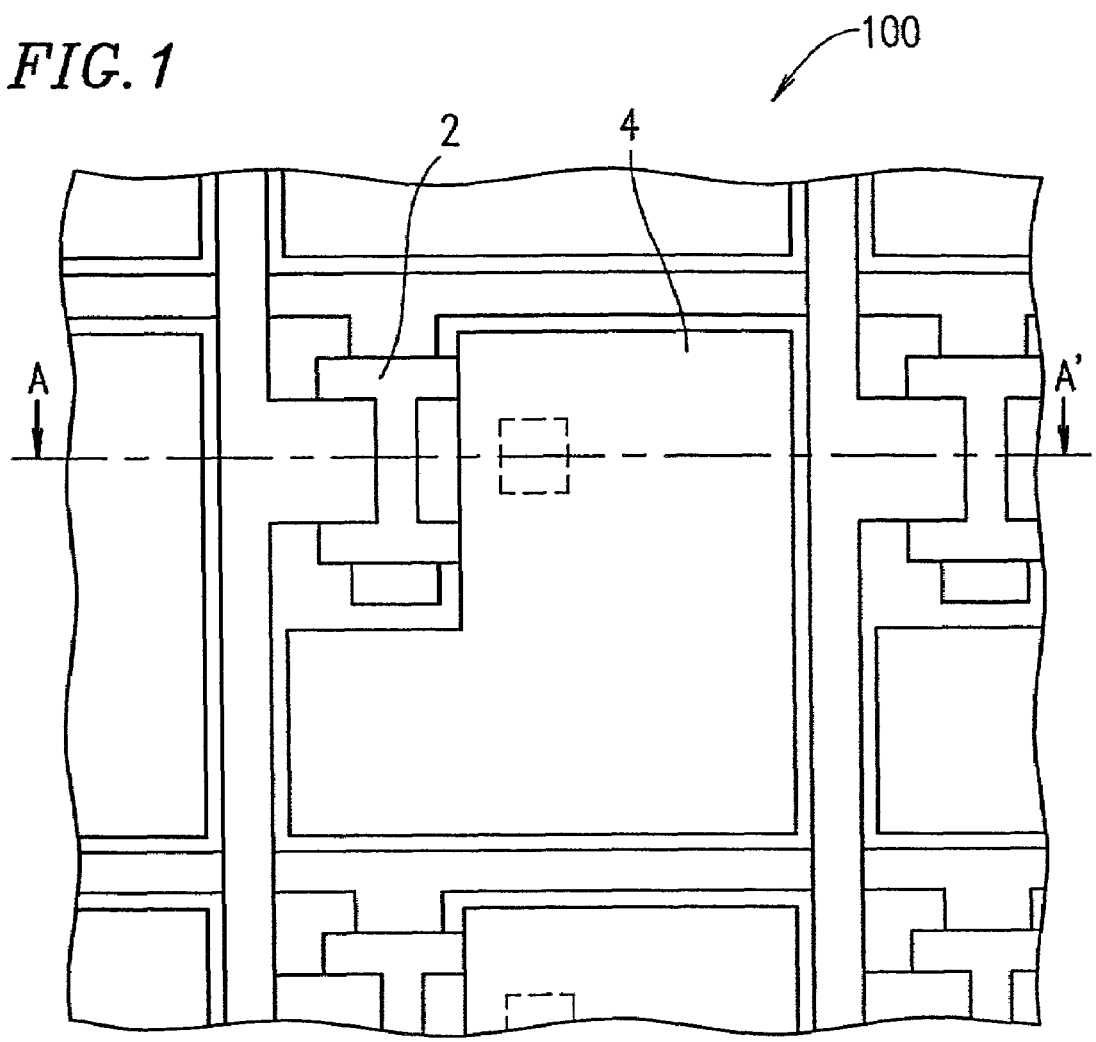
FIG. 1 is a plan view of an LCD according to Example 1 of the present invention for explaining a configuration of an element substrate thereof.

FIG. 1 is a plan view of an LCD 100 according to Example 1 of the present invention for explaining a configuration of an element substrate on which elements are provided. FIG. 2 is a cross-sectional view of the LCD 100 shown in FIG. 1 taken along line A–A'. This LCD 100 comprises a counter substrate 13, an element substrate 14, and a liquid crystal layer 10 therebetween. The element substrate 14 comprises a glass substrate 1, a first insulating film 3, pixel electrodes 4, and a second insulating film 5. The first insulating film 3 comprises protrusions each having tilted surfaces facing two directions. The pixel electrodes 4 are provided on the protrusions in such a manner that the pixel electrodes 4 maintain the shapes of the protrusions. The resultant protrusion structure are buried with the second insulating film 5 whose upper surface is flat. The pixel electrodes 4 are connected to the drains of TFTs 2 provided in the element substrate 14. The counter substrate 13 comprises a glass substrate 6, a color filter 7 and counter electrodes 8. The color filter 7 and the counter electrodes 8 are provided on the glass substrate 6. Vertical alignment films 9 are provided on inner surfaces of the substrates 13 and 14. The liquid crystal layer 10 having negative dielectric anisotropy is sandwiched between the vertical alignment films 9. Further, polarizers 11 and 12 are provided on outer surfaces of the respective substrates 13 and 14.

The tilted surfaces represent surfaces tilted in any direction with respect to a surface parallel to a global surface of the glass substrate 1 (hereinafter referred to as a substrate surface). The tilted surfaces may be curved or flat surfaces. Alternatively, the protrusions may be in the shape of lines having small widths.

The LCD 100 may be fabricated, for example, in the following manner. As to the element substrate 14, TFT 2, and electrode lines, such as gate lines and source lines, are formed on the glass substrate 1. A photosensitive resin film is applied to the resultant glass substrate 1, followed by exposure, development, and baking to form protrusions each having tilted surfaces facing two directions, resulting in the first insulating film 3. For example, when the width and height of a protrusion (pixel pitch or width) is 100 $\mu$m and 5 $\mu$m, respectively, the tilt angle is $\tan^{-1}(5/50) \cong 5.7°$. Note that if the height of a protrusion is excessively high, it is difficult to provide a flat upper surface of the first insulating film 3 in a subsequent process, and an influence on electric lines of force is reduced. Therefore, excessively high protrusions are not preferable. In terms of fabrication processes, the height of a protrusion is preferably less than about 5 $\mu$m, or about 10 $\mu$m at the maximum. If the height of a protrusion is 10 $\mu$m, the tilt angle is 11.3°. If the ratio of the height and half the width of a protrusion is 1:1, the tilt angle is 45°. If a pitch of protrusions is small, such protrusions can be achieved by a thin film which is easy to be processed.

Thereafter, an ITO film is formed over the entirety of the substrate in such a manner as to cover the protrusions. A resist is applied on the ITO film by spin coating to form a resist film. The resist film is subjected to exposure and development using a resist process in a lithography technique to form a pattern for the pixel electrodes 4. Thereafter, the ITO film is etched using the patterned resist film as a mask to form the pixel electrodes 4. In this case, the pixel electrodes 4 are connected to the drains of TFTs 2, and the pixel electrodes 4 maintain the shapes of the protrusions. The pixel electrodes 4 of the ITO film each have a thickness of 10 nm to 1000 nm from a view point of transmittance. The ITO film having such a range of thickness can be provided while maintaining the shapes of the protrusions.

Thereafter, the second insulating film 5 made of $SiN_x$, $SiO_2$, PI, an acrylic resin, or the like is formed to bury the protrusions, thereby providing a flat surface. A thickness of the second insulating film 5 may be such that the protrusions are completely buried and a flat surface of the second insulating film 5 can be obtained, i.e., about 10 $\mu$m at the maximum.

The counter substrate 13 is fabricated by forming the color filter 7 and the counter electrodes 8 on the glass substrate 6. The vertical alignment films 9 are applied to the inner surfaces of the substrates 13 and 14 which are in turn attached to each other. A liquid crystal material is loaded between the substrates 13 and 14 to form the liquid crystal layer 10. Thereafter, the polarizers 11 and 12 are attached to the outer surfaces of the substrates 13 and 14. As a result, the LCD 100 of Example 1 is completed.

In the thus-constructed LCD of Example 1, the orientations of liquid crystal molecules are regulated to predetermined tilted directions in the presence of an applied voltage (domain regulation). The domain regulation will be described with reference to FIGS. 3A to 3C.

Figure 3A:
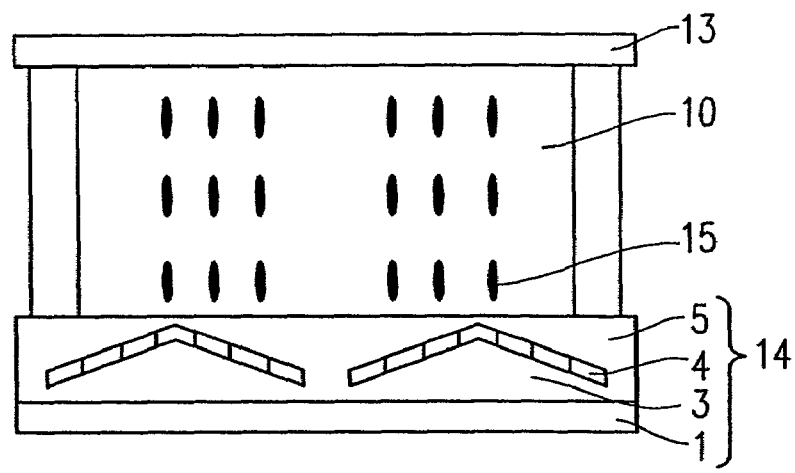
FIGS. 3A to 3C are cross-sectional views of LCDs of Examples 1 and 2 for explaining that orientations of liquid crystal molecules are regulated into slanting directions in the presence of an applied voltage (domain regulation).
Figure 3B:
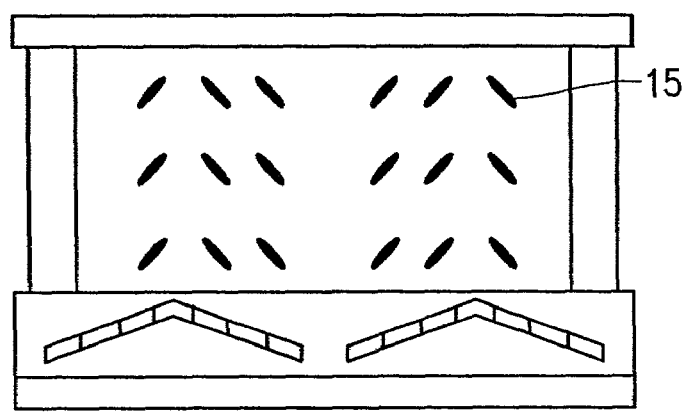
Figure 3C:
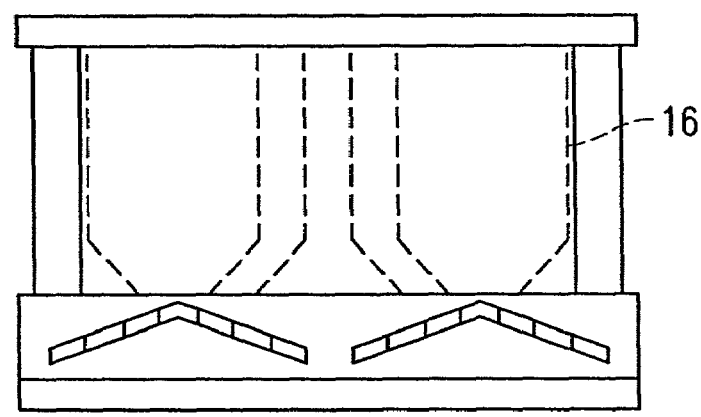

In the LCD, since the liquid crystal layer 10 has negative dielectric anisotropy, the liquid crystal molecules 15 are uniformly oriented in a direction substantially perpendicular to the element substrate 14 in the absence of an applied voltage as shown in FIG. 3A. However, as shown in FIG. 3C, when a voltage less than a predetermined voltage, which causes the liquid crystal molecules 15 in the liquid crystal layer 10 to be substantially parallel to the element substrate 14, is applied between the substrates 13 and 14, as shown in FIG. 3B, the electric lines of force 16 are bent in predetermined directions on the upper surface of the substrate 14. This is because the first insulating film 3 comprising the protrusions each having tilted surfaces facing two directions is provided on the glass substrate 1, the pixel electrodes 4 are provided on the first insulating film 3 while the shapes of the protrusions are maintained, and the second insulating film 5 is provided to bury the protrusions to obtain the flat upper surface of the element substrate 14. In this situation, the tilted orientations of the liquid crystal molecules 15 are regularly regulated to two predetermined directions due to the protrusions having tilted surfaces facing two directions. In this case, the predetermined directions are directions which are intended to cause viewing angle characteristics to be satisfactory. For example, in the case when tilted surfaces facing two directions are provided as shown in FIG. 3C, the predetermined directions represent the two directions, i.e., directions substantially perpendicular to the tilted surfaces. When the protrusions are in the shape of a spiral, the liquid crystal molecules are oriented in all directions (360° direction) with respect to an axis substantially perpendicular to the substrates 13 and 14.

The reason the orientations of the liquid crystal molecules are regularly regulated is that electric lines of force generated in the presence of an applied voltage are substantially perpendicular to the tilted surfaces of the pixel electrodes 4 in the vicinity of an interface between the liquid crystal layer 10 and the element substrate 14. In the LCD of Example 1, since the pixel electrodes 4 having tilted surfaces facing two or more directions is provided closer to the liquid crystal layer 10, the liquid crystal molecules 15 in the vicinity of the tilted surfaces are oriented in different directions separated by boundaries between the tilted surfaces in the presence of an applied voltage. In this case, in the liquid crystal layer 10, the effect of an electric field is higher in the vicinity of the pixel electrodes 4 than a middle portion of the liquid crystal layer 10. The liquid crystal molecule 15 in the middle portion of the substrate are tilted in such a manner as to follow the orientations of the liquid crystal molecule 15 tilted in accordance with the tilted surfaces of the pixel electrodes 4.

Figure 18A:
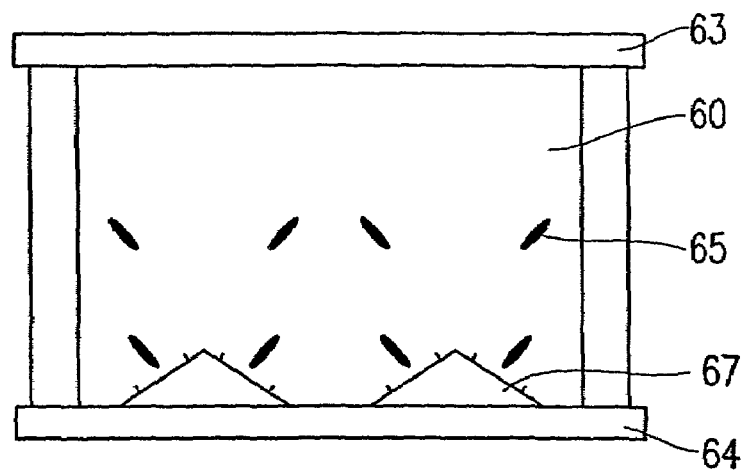
FIGS. 18A to 18C are cross-sectional views for explaining alignment states of a conventional LCD.
Figure 18B:
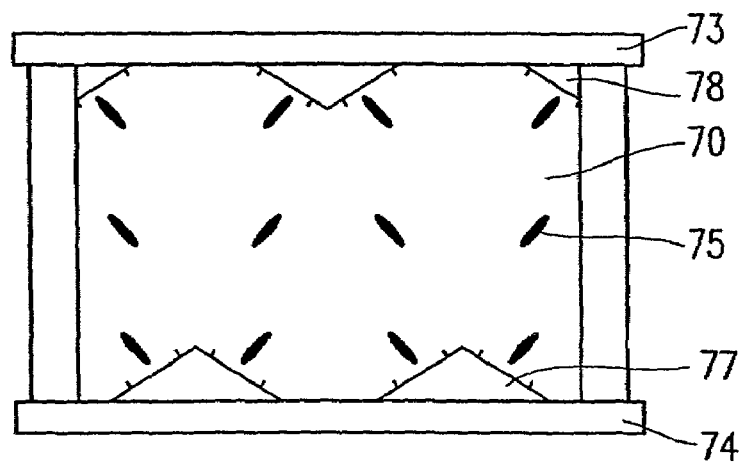
Figure 18C:
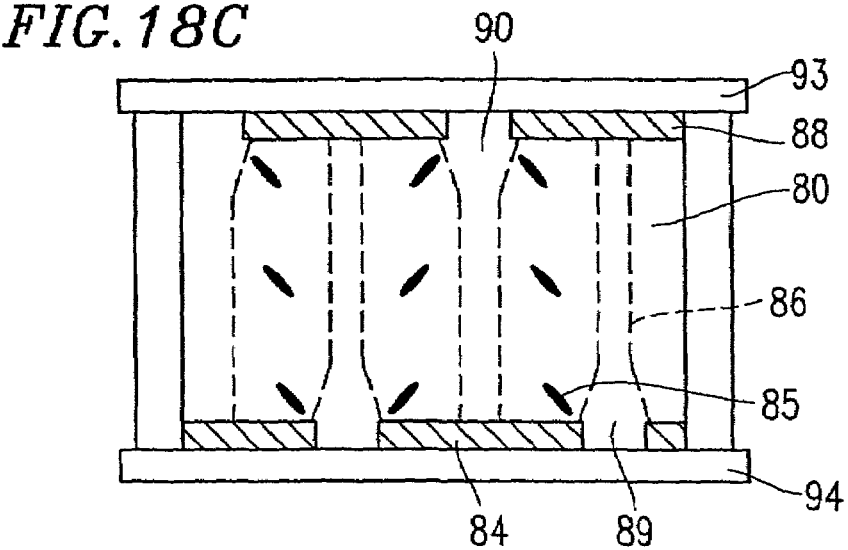

As a result, it is possible to avoid the so-called viewing angle dependence problem with conventional LCDs, in which all liquid crystal molecules are oriented in the same direction, such that the intensity of transmitted light or hue is changed depending on a viewing angle. Further, the second insulating film 5 is provided on the pixel electrodes 4 to cause the element substrate 14 to have the flat upper surface. Therefore, it is possible to avoid the above-described problems with the conventional LCD shown in FIGS. 18A and 18B where the distance between substrates 63 and 64 sandwiching the liquid crystal layer 60 is not uniform, and that since a pit-and-protrusion shaped surface is provided at an interface between a liquid crystal layer and a substrate, liquid crystal molecules are tilted at the same angle as that of the pit-and-protrusion shaped surface, and contrast in the absence of an applied voltage is lowered.

EXAMPLE 2

Figure 4:
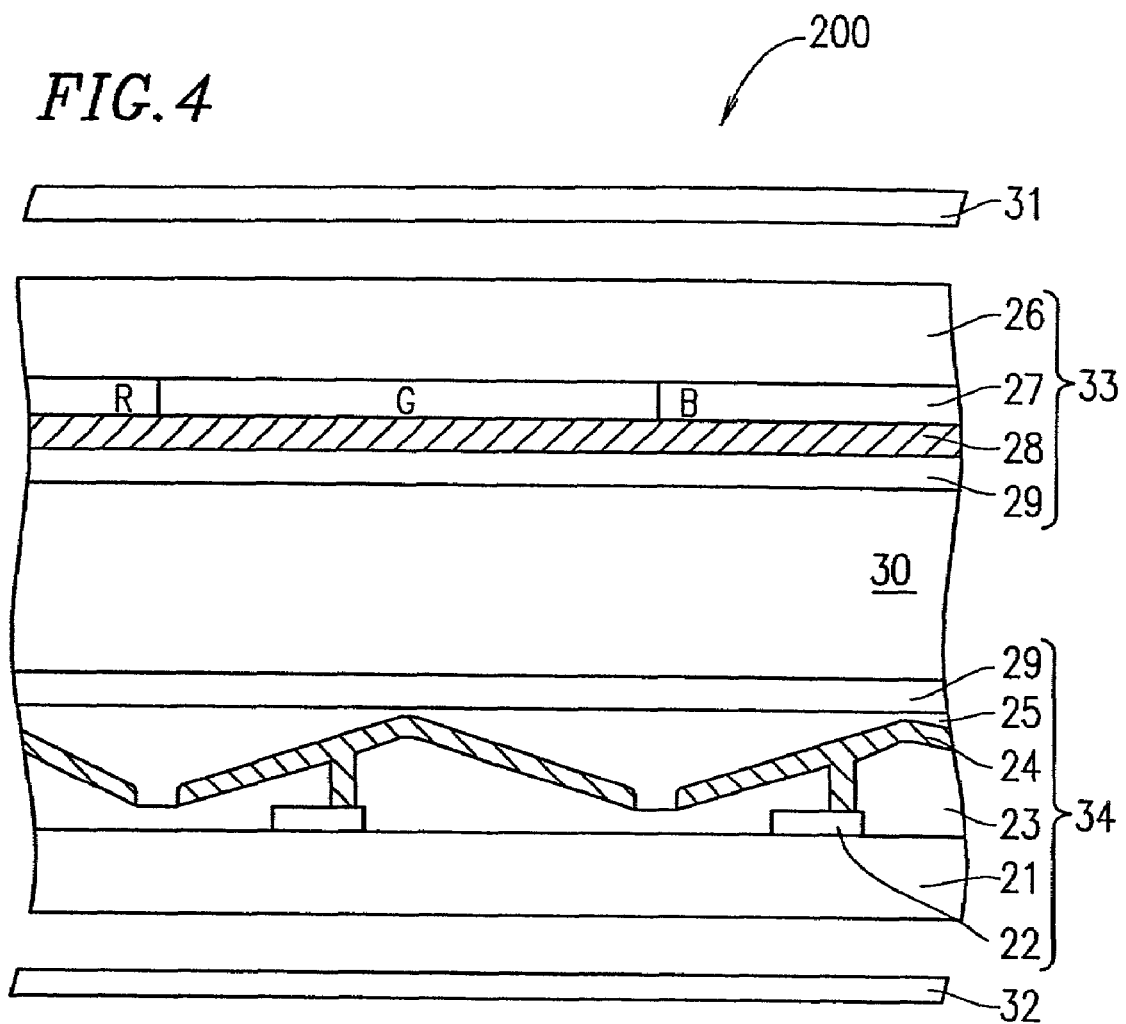
FIG. 4 is a cross-sectional view showing an configuration of an LCD according to Example 2 of the present invention.

FIG. 4 is a cross-sectional view of an LCD 200 according to Example 2 of the present invention, for explaining a configuration of an element substrate on which elements are provided. This LCD 200 comprises a counter substrate 33, an element substrate 34, and a liquid crystal layer 30 therebetween. The element substrate 34 comprises a glass substrate 21, a first insulating film 23, pixel electrodes 24, and a second insulating film 25. The first insulating film 23 comprises protrusions, each having tilted surfaces facing two directions. The pixel electrodes 24 are provided on the protrusions in such a manner that the pixel electrodes 24 maintain the shapes of the protrusions. The resultant protrusion structure is buried with the second insulating film 25 whose upper surface is flat. The first insulating film 23 comprises contact holes and covers TFTs 22 provided on the glass substrate 1. The pixel electrodes 24 are connected to the drains of the TFTs 22. The counter substrate 33 comprises a glass substrate 26, a color filter 27 and counter electrodes 28. The color filter 27 and the counter electrodes 28 are provided on the glass substrate 26. Vertical alignment films 29 are provided on inner surfaces of the substrates 33 and 34. The liquid crystal layer 30 having negative dielectric anisotropy is sandwiched between the vertical alignment films 29. Further, polarizers 31 and 32 are provided on outer surfaces of the respective substrates 33 and 34.

The LCD 200 may be fabricated, for example, in the following manner. As to the element substrate 34, TFT 22, and electrode lines, such as gate and source lines, are formed on the glass substrate 21. A photosensitive resin film is applied to the resultant glass substrate 21, followed by exposure, development, and baking to form protrusions each having tilted surfaces facing two directions, resulting in the first insulating film 23. In the first insulating film 23, the protrusions function to provide domain regulation, and electrically isolate the pixel electrodes 24, which is provided on the protrusions in order to increase an aperture area, from the underlying TFTs 22 and electrode lines. The height of the protrusions is less than about 10 μm, similar to Example 1.

Thereafter, an ITO film is formed over the entirety of the substrate in such a manner as to cover the protrusions. A resist is applied on the ITO film by spin coating to form a resist film. The resist film is subjected to exposure and development using a resist process in a lithography technique to form a pattern for the pixel electrodes 24. Thereafter, the ITO film is etched using the patterned resist film as a mask to form the pixel electrodes 24. In this case, the pixel electrodes 24 are connected via the contact holes to the drains of TFTs 22, and the pixel electrodes 24 maintain the shapes of the protrusions. Preferably, the pixel electrodes 24 of the ITO film each have a thickness of 10 nm to 1000 nm, similar to Example 1.

Thereafter, the second insulating film 25 made of $SiN_x$, $SiO_2$, PI, an acrylic resin, or the like is formed to bury the protrusions, thereby providing a flat surface. A thickness of the second insulating film 25 may be about 10 μm at the maximum, similar to Example 1.

The counter substrate 33 is fabricated by forming the color filter 27 and the counter electrodes 28 on the glass substrate 26. The vertical alignment films 29 are applied to the inner surfaces of the substrates 33 and 34 which are in turn attached to each other. Liquid crystal is loaded between the substrates 33 and 34 to form the liquid crystal layer 30. Thereafter, the polarizers 31 and 32 are attached to the outer surfaces of the substrates 33 and 34. As a result, the LCD 200 of Example 2 is completed.

In the thus-constructed LCD 200 of Example 2, the orientations of liquid crystal molecules are regulated to predetermined tilted directions in the presence of an applied voltage (domain regulation), similar to Example 1. According to Example 2, the pixel electrodes 24, the TFTs 22 and the electrode lines overlap each other, thereby increasing the aperture area. It is also possible to prevent irregular orientation in the vicinity of ends of pixel electrodes due to an influence of the electrode lines on liquid crystal alignment.

EXAMPLE 3

FIGS. 5A to 5C are cross-sectional views for explaining domain regulation of an LCD 300 according to Example 3 of the present invention.

In this LCD 300, apexes 17 of pixel electrodes 4 provided in an element substrate 19 are exposed from a second insulating film 18. Except for this feature, the LCD of Example 3 has the same configuration as that of Example 1. The LCD 300 of Example 3 may have a structure similar to that of Example 2, in which the pixel electrodes 4, TFTs and electrode lines overlap each other.

The LCD 300 may be fabricated, for example, in the following manner. As to the element substrate 19, TFTs 2, and electrode lines, such as gate and source lines, are formed on the glass substrate 1. A photosensitive resin film is applied to the resultant glass substrate 1, followed by exposure, development, and baking to form protrusions each having tilted surfaces facing two directions, resulting in a first insulating film 3. The height of the protrusions is less than about 10 μm, similar to Example 1.

Thereafter, an ITO film is formed over the entirety of the substrate in such a manner as to cover the protrusions. A resist is applied on the ITO film by spin coating to form a resist film. The resist film is subjected to exposure and development using a resist process in a lithography technique to form a pattern for the pixel electrodes 4. Thereafter, the ITO film is etched using the patterned resist film as a mask to form the pixel electrodes 4. In this case, the pixel electrodes 4 are connected to the drains of TFTs 2, and the pixel electrodes 4 maintain the shapes of the protrusions. Preferably, the pixel electrodes 4 of the ITO film each have a thickness of 10 nm to 1000 nm, similar to Example 1.

Thereafter, a second insulating film 18 made of $SiN_x$, $SiO_2$, PI, an acrylic resin, or the like is formed to bury the protrusions, thereby providing a flat surface while only the apex portions 17 of the pixel electrodes 4 are kept exposed. Alternatively, after well burying the protrusions, the apex portions 17 of the pixel electrodes 4 may be exposed by etching ($O_2$ plasma etching for acrylic resin or PI, and hydro fluoride etchant for $SiN_x$ or $SiO_2$). A thickness of the second insulating film 18 may be about 10 μm at the maximum, similar to Example 1.

The counter substrate 13 is fabricated by forming the color filter 7 and the counter electrodes 8 on the glass substrate 6. The vertical alignment films 9 are applied to the inner surfaces of the substrates 13 and 19 which are in turn attached to each other. A liquid crystal material is loaded between the substrates 13 and 19 to form the liquid crystal layer 10. Thereafter, polarizers (not shown) are attached to the outer surfaces of the substrates 13 and 19. As a result, the LCD 300 of Example 3 is completed.

In the thus-constructed LCD 300, since liquid crystal molecules 15 in the liquid crystal layer 10 have negative dielectric anisotropy, the liquid crystal molecules 15 are uniformly oriented in a direction substantially perpendicular to the element substrate 19 in the absence of an applied voltage as shown in FIG. 5A. However, as shown in FIG. 5C, when a voltage less than a predetermined voltage, which causes the liquid crystal molecules 15 in the liquid crystal layer 10 to be substantially parallel to the element substrate 19, is applied between the substrates 13 and 19, electric lines of force 16 are bent in predetermined directions on an upper surface of the substrate 19 except for the apex portion 17 of the pixel electrodes 4. This is because the first insulating film 3 comprising the protrusions each having tilted surfaces facing two directions is provided on the glass substrate 1, the pixel electrodes 4 are provided on the first insulating film 3 while the shapes of the protrusions are maintained, and the second insulating film 5 is provided to bury the protrusions to obtain the flat upper surface of the element substrate 19. In this situation, as shown in FIG. 5B, the tilted orientations of the liquid crystal molecules 15 are regularly regulated to two predetermined directions due to the protrusions having tilted surfaces facing two directions. Since the apex portions 17 of the pixel electrodes 4 are exposed from the second insulating film 18, boundaries of orientations of the liquid crystal molecules 15 are clearly provided as compared to Examples 1 and 2.

If the apex portion 17 has a surface tension different from that of surrounding portions (the second insulating film 18), the alignment of the liquid crystal layer 10 can be locally changed so that the boundaries can be reliably fixed.

Figure 6A:
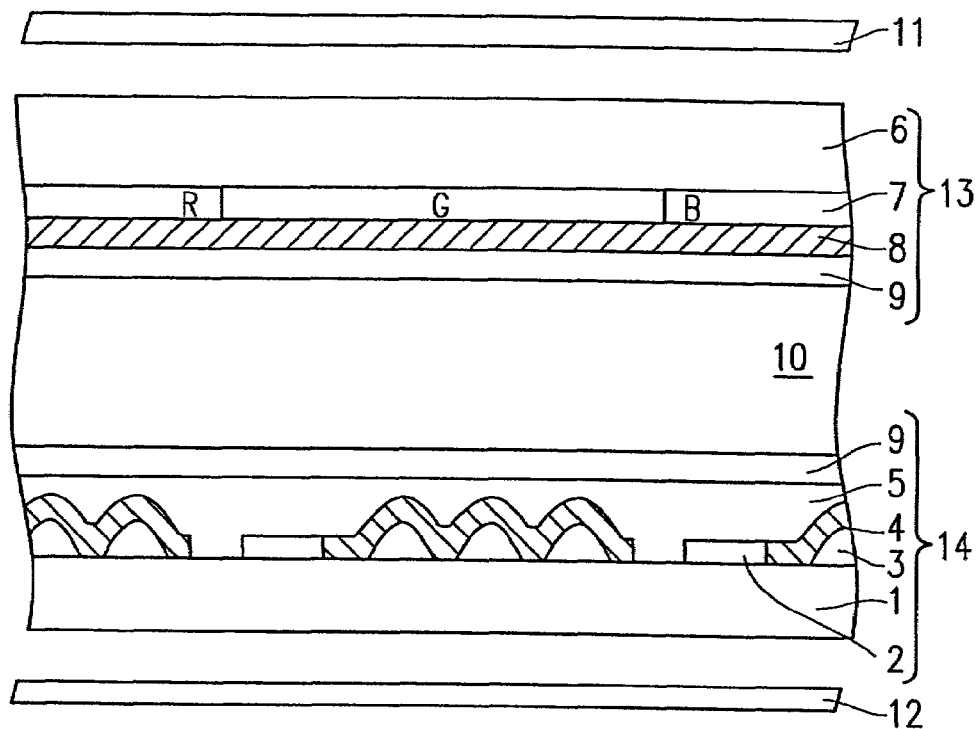
FIG. 6A is a cross-sectional view for explaining another configuration of the LCD of Example 1.
Figure 6B:
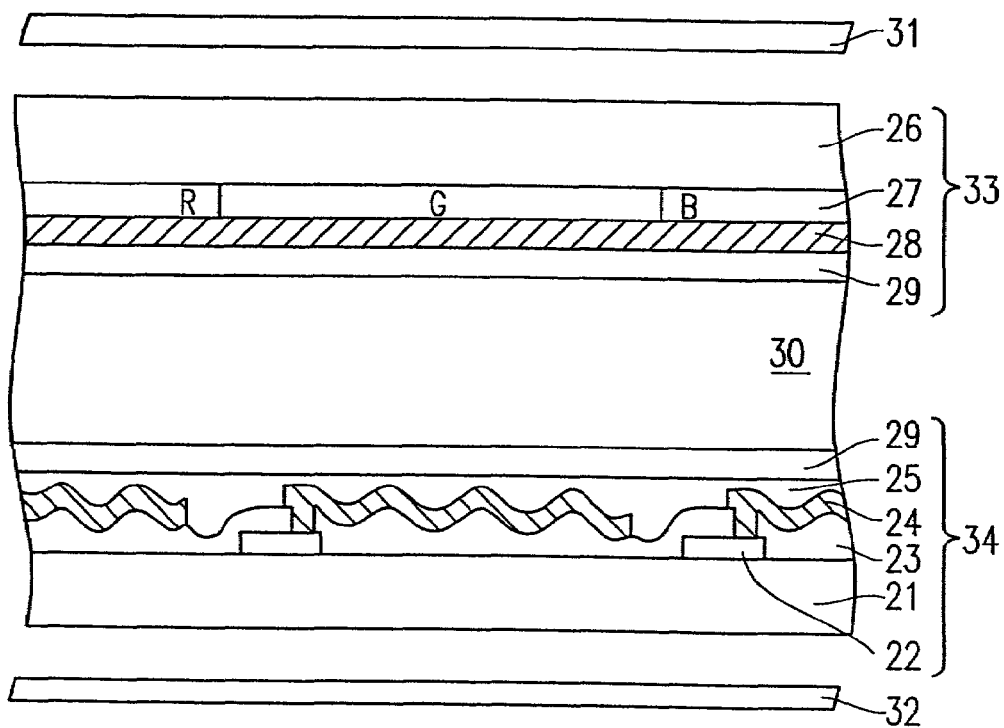
FIG. 6B is a cross-sectional view for explaining another configuration of the LCD of Example 2.

In Examples 1 to 3, tilted surfaces having two directions are formed using protrusions. Alternatively, tilted surfaces having two directions may be formed using pits. Further, tilted surfaces having two or more directions may be formed using protrusions and pits. Furthermore, protrusions may be formed in such a manner as to be contiguous into a pit-and-projection pattern, as shown in FIG. 6A in Example 1 or FIG. 6B in Example 2, for example.

Figure 7A:
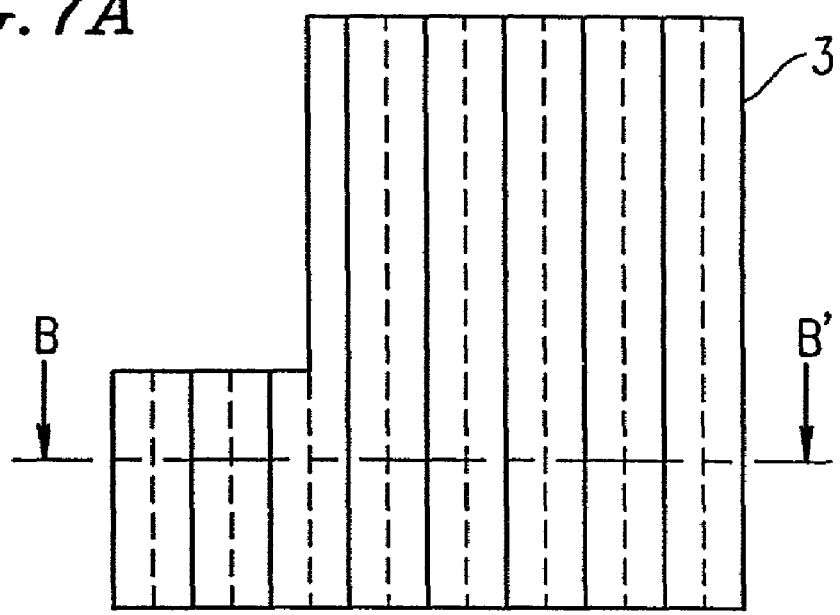
FIG. 7A is a plan view for explaining an exemplary pit-and-protrusion pattern having tilted surfaces facing two or more directions.
Figure 7B:
FIG. 7B is a cross-sectional view of FIG. 7A taken along line B–B'.
Figure 8A:
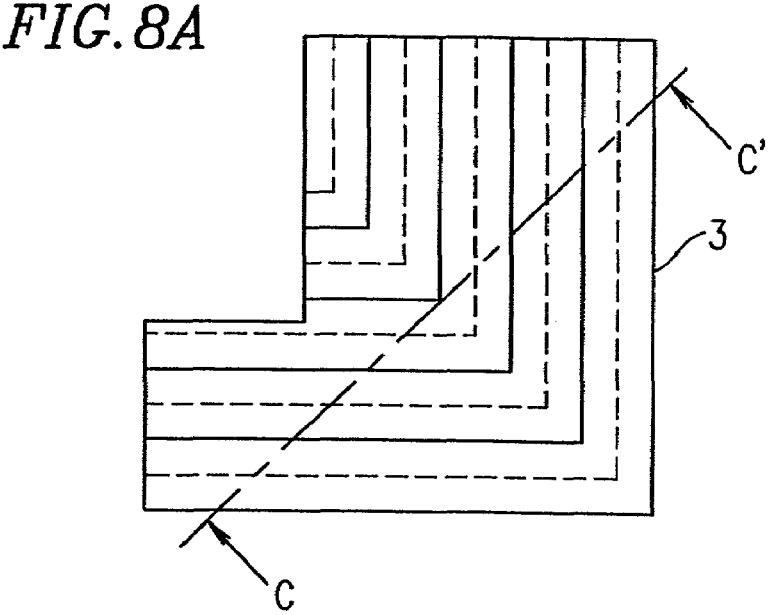
FIG. 8A is a plan view for explaining another exemplary pit-and-protrusion pattern having tilted surfaces facing two or more directions.
Figure 8B:
FIG. 8B is a cross-sectional view of FIG. 8A taken along line C–C'.
Figure 8C:
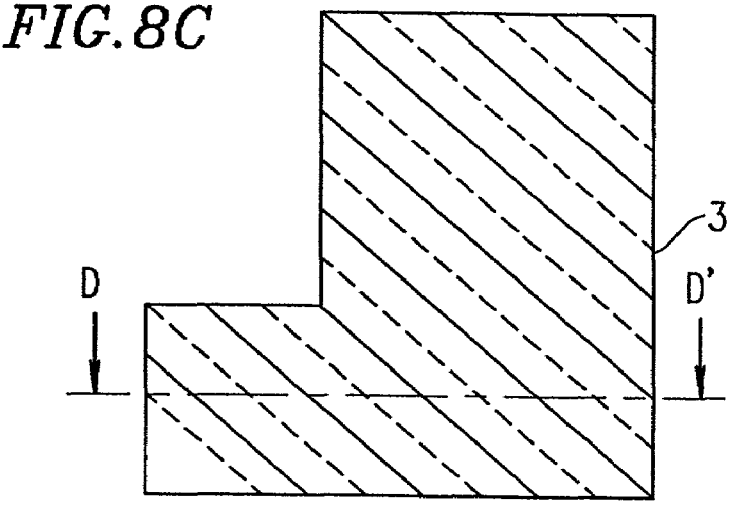
FIG. 8C is a plan view for explaining still another exemplary pit-and-protrusion pattern having tilted surfaces facing two or more directions.
Figure 8D:
FIG. 8D is a cross-sectional view of FIG. 8C taken along line D–D'.

In the first insulating film 3, the protrusions are formed in such a manner as to be contiguous into a pit-and-protrusion pattern as shown in FIG. 7A and FIG. 7B which are cross-sectional views of FIG. 7A taken along line B–B', a domain regulating means is provided in which the alignment of liquid crystal molecules are regulated rightward and leftward. Further, if a pit-and-protrusion pattern as shown in FIG. 8A and FIG. 8B, which are cross-sectional views of FIG. 8A taken along line C–C', is provided, a domain regulating means is provided in which the alignment of liquid crystal molecules are regulated upward and downward in addition to rightward and leftward. Furthermore, if a pit-and-protrusion pattern as shown in FIG. 8C and FIG. 8D, which is a cross-sectional view of FIG. 8C taken along line D–D', is provided, a domain regulating means is provided in which the alignment of liquid crystal molecules are regulated to slanting directions. Thus, by changing a pit-and-protrusion pattern, it is possible to provide a domain regulating means in which the alignment of liquid crystal molecules are regulated to desired directions.

Figure 9A:
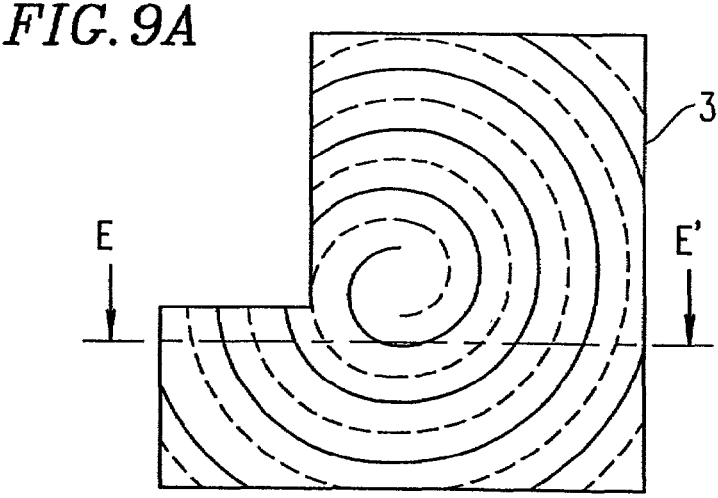
FIG. 9A is a plan view for explaining still another exemplary pit-and-protrusion pattern having tilted surfaces facing two or more directions.
Figure 9B:
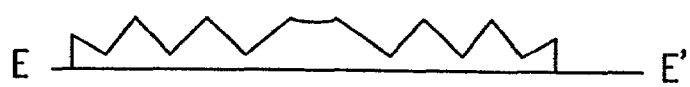
FIG. 9B is a cross-sectional view of FIG. 9A taken along line E–E'.
Figure 9C:
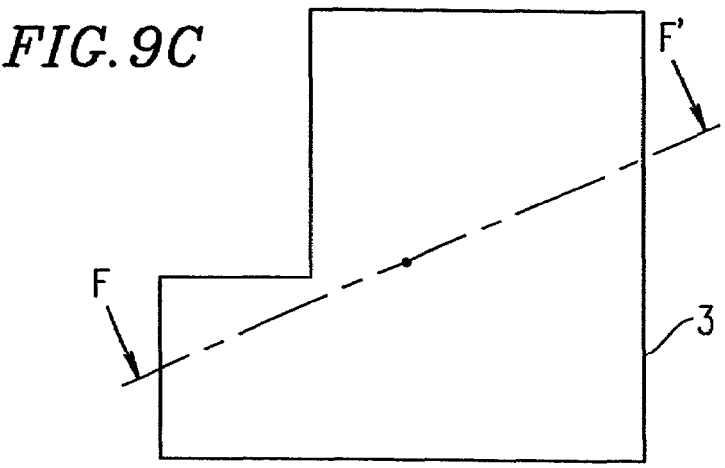
FIG. 9C is a plan view for explaining still another exemplary pit-and-protrusion pattern having tilted surfaces facing two or more directions.
Figure 9D:
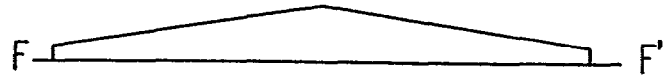
FIG. 9D is a cross-sectional view of FIG. 9C taken along line F–F'.

Furthermore, if a pit-and-protrusion pattern as shown in FIG. 9A and FIG. 9B, which is a cross-sectional view of FIG. 9A taken along line E–E', is provided, a domain regulating means is provided in which the alignment of liquid crystal molecules is azimuthal (360° directions) but not regulated to only four directions, thereby avoiding the viewing angle dependence problem. In this case, a plurality of protrusions in the pattern of a spiral may be provided as shown in FIGS. 9A and 9B. Alternatively, a protrusion in the shape of a cone may be provided as shown in FIG. 9C and FIG. 9D, which is a cross-sectional view of FIG. 9C taken along line F–F'.

Further, tilted surfaces facing two or more directions may be curved or flat if the tilted surface can regulate the alignment of liquid crystal molecules to bend electric lines of force in the two or more directions.

In Examples 1 to 3, a set of tilted surfaces facing at least two surfaces corresponds to a pixel (in an LCD, pixels are arranged in a matrix). If a set of tilted surfaces facing at least two directions are provided across two or more pixels, viewing angle dependence varies from pixel to pixel, or in the case of color display, viewing angle dependence of adjacent different color pixels varies, which deteriorates display quality. Therefore, a set of tilted surfaces is preferably provided on a basis of one or less pixel, whereby the inherent effect of the present invention can be obtained.

In Examples 1 to 3, although a vertical alignment film is provided on a second insulating film, the vertical alignment film may also serve as a second insulating film if the vertical alignment film is provided on pixel electrodes so that an upper surface of the vertical alignment film can be made flat. The present invention is not limited to active matrix LCDs and can be applied to passive matrix LCDs. Though a more significant effect of the present invention can be obtained for active matrix LCDS.

Further, in Examples 1 to 3, a domain regulating means, in which protrusions or pits are provided to construct tilted surfaces having at least two directions, is provided on an element substrate. Alternatively, such a domain regulating means may be provided on a counter substrate without a problem, as described in the following examples, whereby substantially the same effect as when a domain regulating means is provided on an element substrate is obtained.

EXAMPLE 4

Figure 10A:
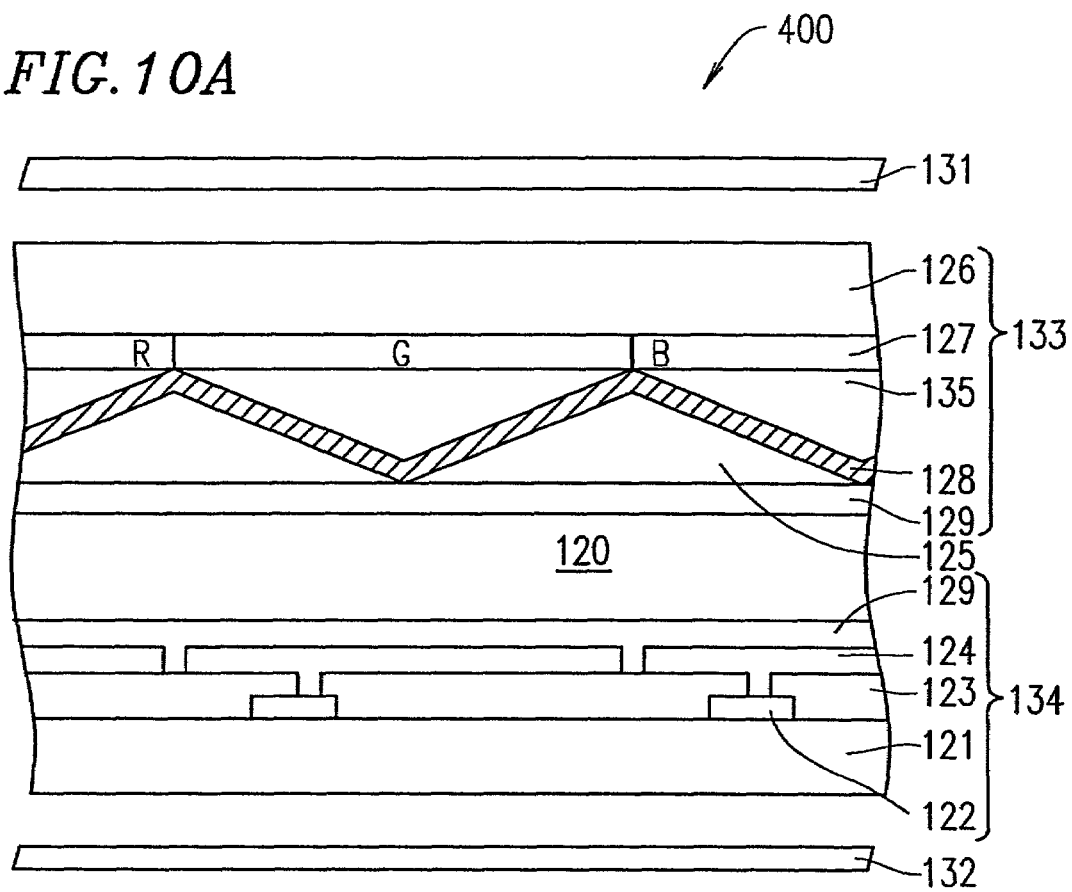
FIG. 10A is a cross-sectional view showing a configuration of an LCD according to Example 4 of the present invention.
Figure 10B:
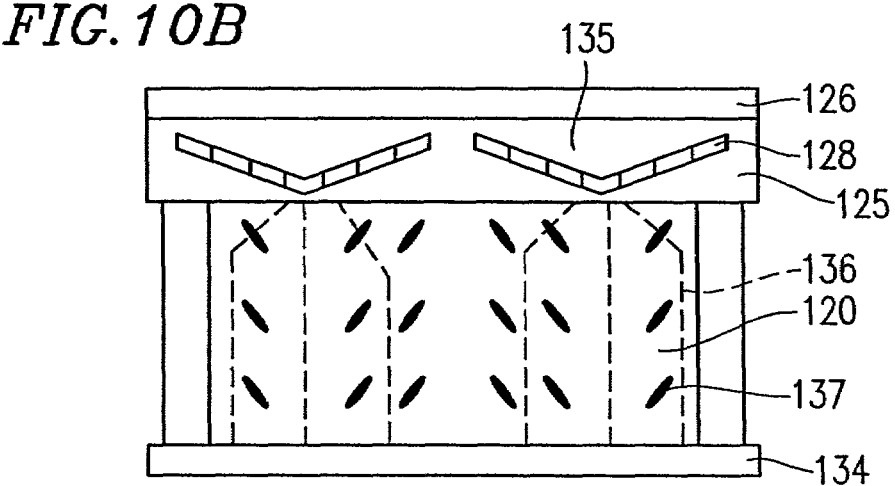
FIG. 10B is a cross-sectional view for explaining an alignment state of the LCD shown in FIG. 10A.

FIG. 10A and 10B are cross-sectional views showing a configuration of an LCD 400 according to Example 4 of the present invention. This LCD 400 comprises a counter substrate 133, an element substrate 134, and a liquid crystal layer 120 therebetween. The counter substrate 133 comprises a glass substrate 126, a color filter 127, a first insulating film 135, counter electrodes 128, and a second insulating film 125. The color filter 127 is provided on the glass substrate 126. The first insulating film 135 comprising protrusions each having tilted surfaces facing two directions is provided on the color filter 127. The counter electrodes 128 are provided on the protrusions while the shapes of the protrusions are maintained. The second insulating film 125 is provided to bury the protrusions so that an upper surface of the second insulating film 125 is made flat. The element substrate 134 comprises a glass substrate 121, TFTs 122, an insulating film 123, and pixel electrodes 124. The TFTs 122, the insulating film 123, and the pixel electrodes 124 are provided on the glass substrate 121. The pixel electrodes 124 are connected to the drains of the TFTs 122. Vertical alignment films 129 are provided on inner surfaces of the substrates 133 and 134. The liquid crystal layer 120 having negative dielectric anisotropy is sandwiched between the vertical alignment films 129. Further, polarizers 131 and 132 are provided on outer surfaces of the respective substrates 133 and 134.

In the LCD 400, since the liquid crystal layer 120 has negative dielectric anisotropy, liquid crystal molecules in the liquid crystal layer 120 are oriented in a direction substantially perpendicular to the substrates 133 and 134 in the absence of an applied voltage. However, as shown in FIG. 10B, when a voltage less than a predetermined voltage, which causes the liquid crystal molecules in the liquid crystal layer 120 to be substantially horizontal, is applied between the substrates 133 and 134, the electric lines of force 136 are bent in predetermined directions on the upper surface of the counter substrate 133. This is because the first insulating film 135 comprising the protrusions each having tilted surfaces facing two directions is provided on the glass substrate 126, the counter electrodes 128 are provided on the first insulating film 135 while the shapes of the protrusions are maintained, and the second insulating film 125 is provided to bury the protrusions to obtain the flat upper surface of the element substrate 133. In this situation, as shown in FIG. 10B, the tilted orientations of the liquid crystal molecules are regularly regulated to two predetermined directions due to the protrusions each having tilted surfaces facing two directions.

As a result, it is possible to avoid the so-called viewing angle dependence problem with conventional LCDs, in which all liquid crystal molecules are oriented in the same direction, such that the intensity of transmitted light or hue is changed depending on a viewing angle. Further, the second insulating film 125 is provided on the counter electrodes 128 to cause the counter substrate 133 to have the flat upper surface. Therefore, it is possible to avoid the above-described problems with the conventional LCD shown in FIGS. 18A and 18B where the distance between substrates 63 and 64 sandwiching the liquid crystal layer 60 is not uniform.

As described above, in Example 4, a domain regulating means is provided on a counter substrate. In this case, protrusions, pits, or a pit-and-protrusion pattern may also be fabricated by a technique as described in Examples 1 to 3.

Figure 11:
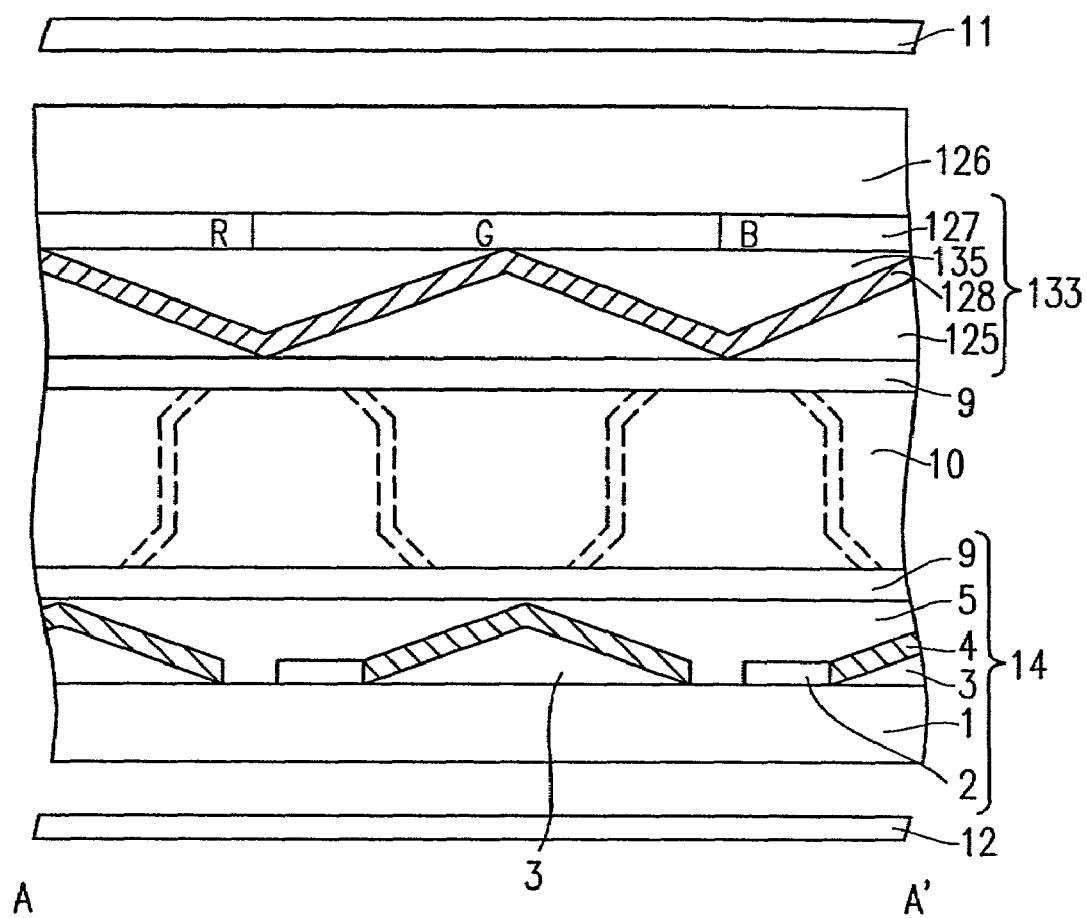
FIG. 11 is a cross-sectional view showing a configuration of another LCD according to Example 4 of the present invention.

Further, as shown in FIG. 11, a domain regulating means may be provided on each of the element and counter substrates. In FIG. 11, dashed lines represent electric lines of force in the presence of an applied voltage. In this case, tilted surfaces of pixel electrodes and counter electrodes are preferably designed so that pit portions of the tilted surfaces of the counter electrodes face apex portions of the tilted surfaces of the pixel electrodes. Note that the sizes of the protrusions (pits) of the pixel electrodes may be different from the sizes of the protrusions (pits) of the counter electrodes.

In Examples 1 to 4, to provide protrusions, pits, or a pit-and-protrusion pattern having tilted surfaces facing at least two directions on a first insulating film, a material for an insulating film, such as an acrylic resin, is applied to a substrate, and is pressed with a mold having a reversed shape of the pit-and-protrusion pattern or the like, followed by curing to transcribe the pit-and-protrusion pattern or the like to the insulating film, and finally the mold is removed.

EXAMPLE 5

Figure 12:
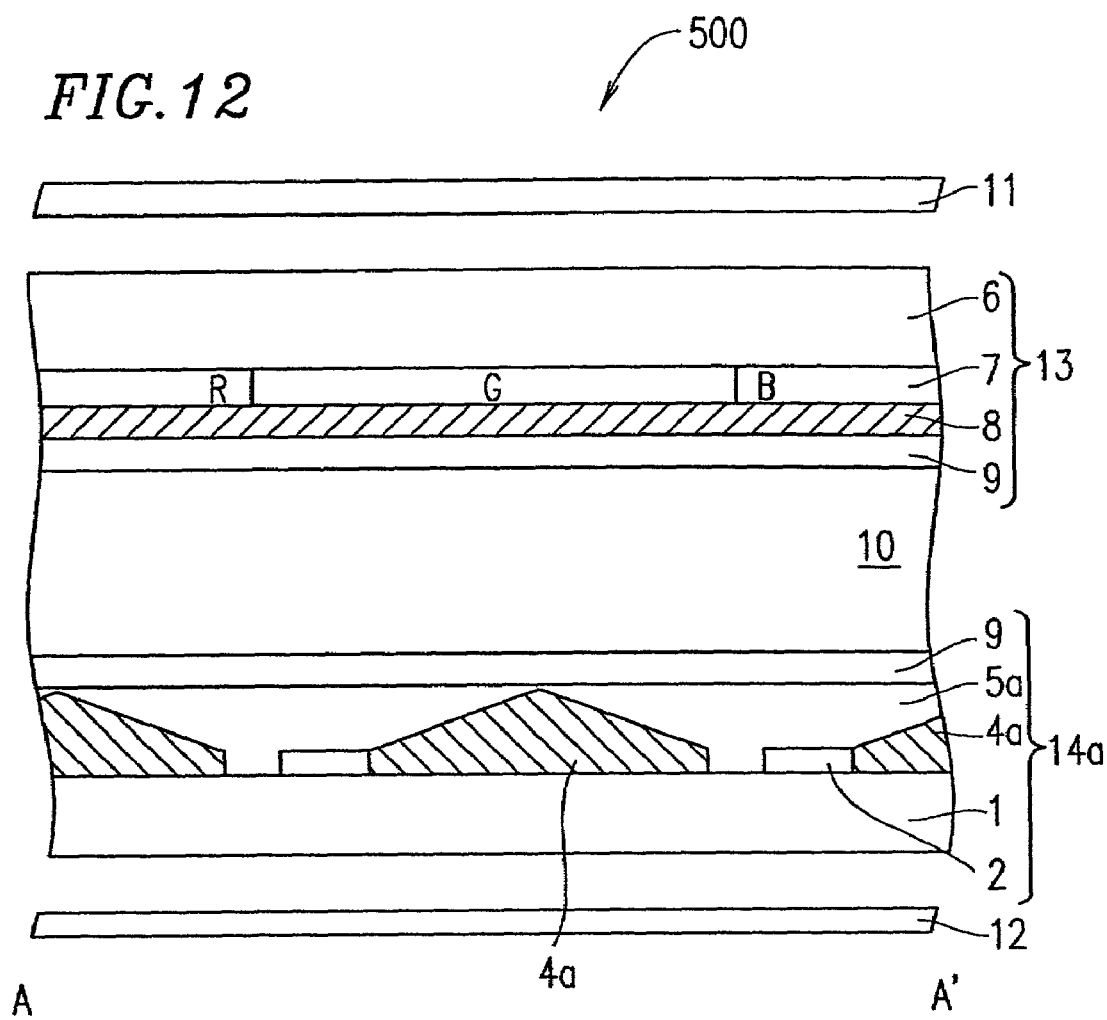
FIG. 12 is a cross-sectional view showing a configuration of an LCD according to Example 5 of the present invention.
Figure 13:
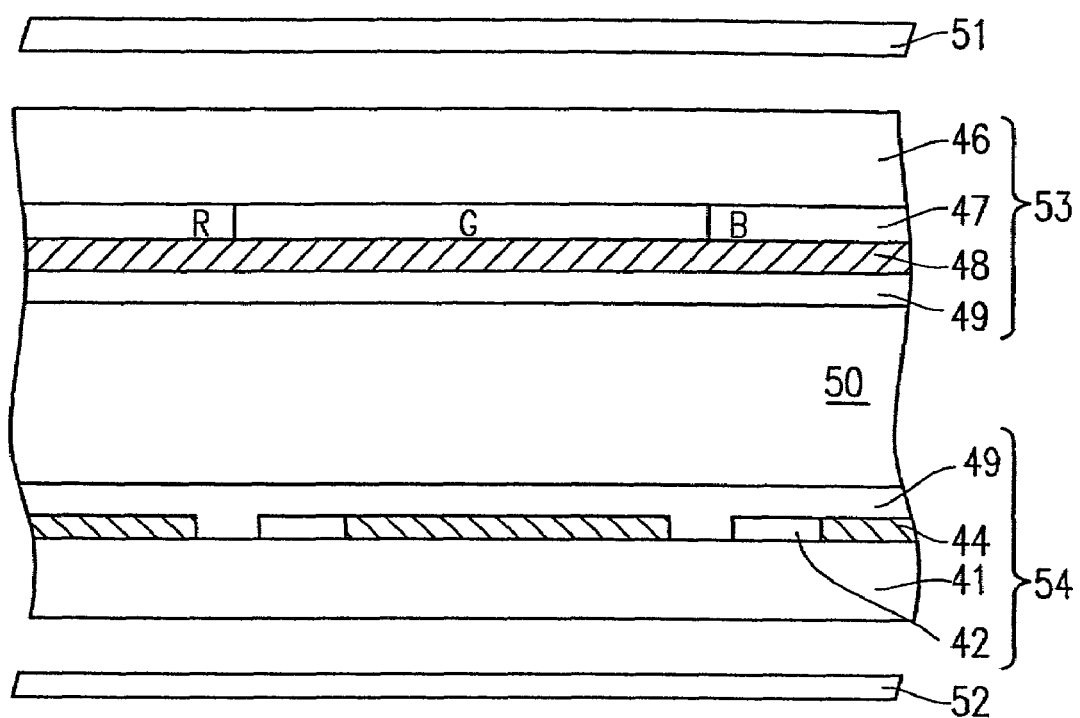
FIG. 13 is a cross-sectional view showing a configuration of a conventional LCD.
Figure 14A:
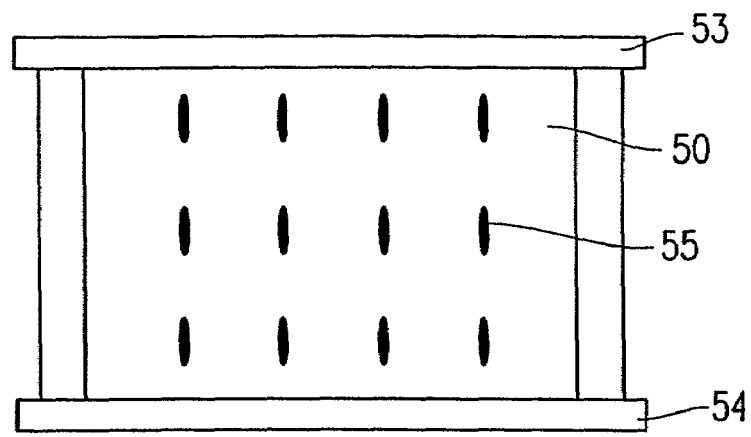
FIGS. 14A to 14C are cross-sectional views for explaining alignment states of a conventional LCD.
Figure 14B:
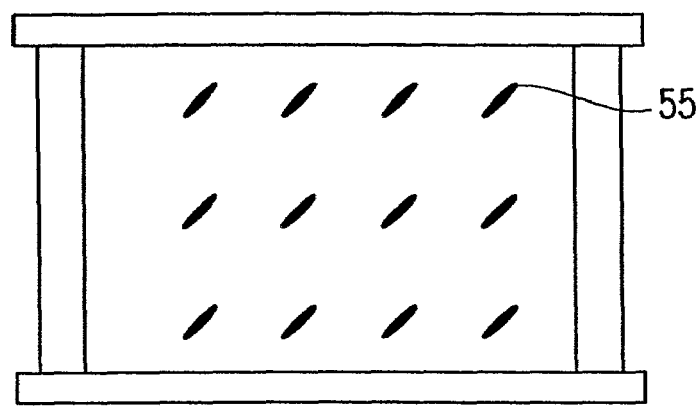
Figure 14C:
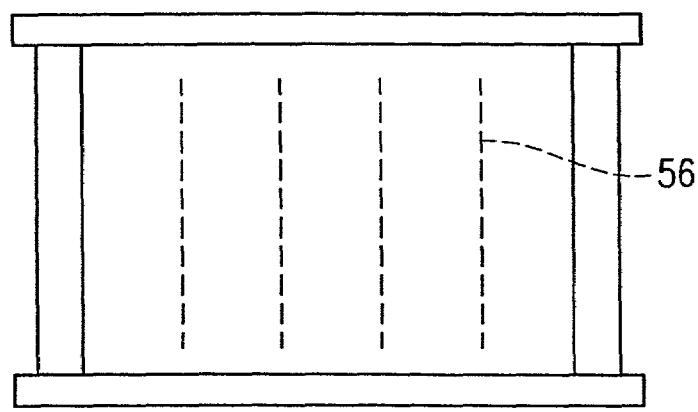
Figure 15A:
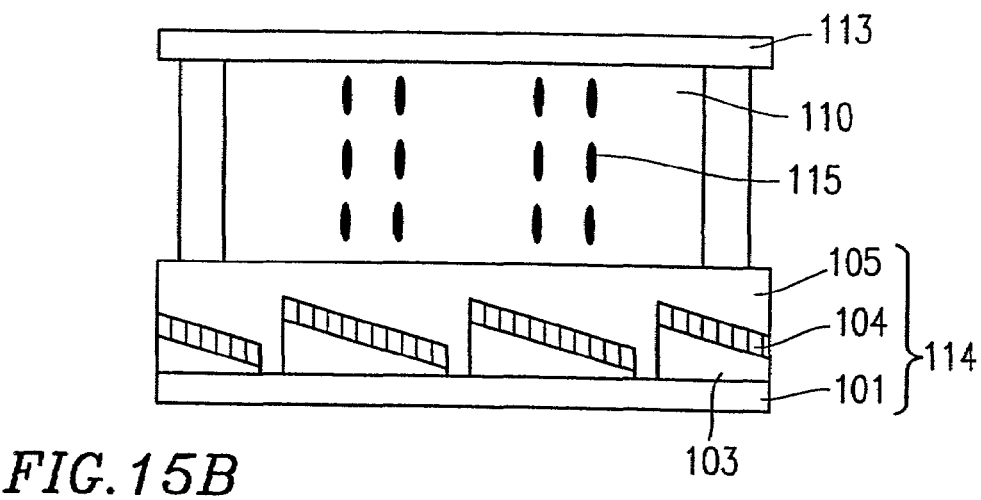
FIGS. 15A to 15C are cross-sectional views for explaining alignment states of a conventional-LCD.
Figure 15B:
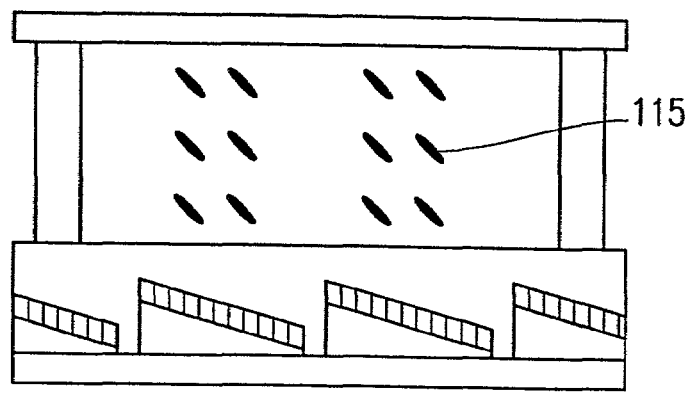
Figure 15C:
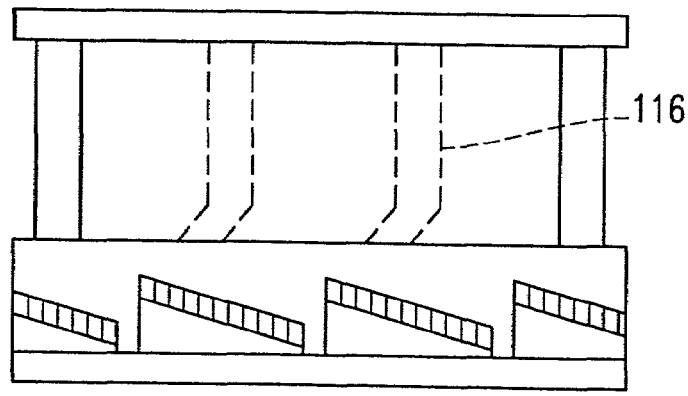
Figure 16:
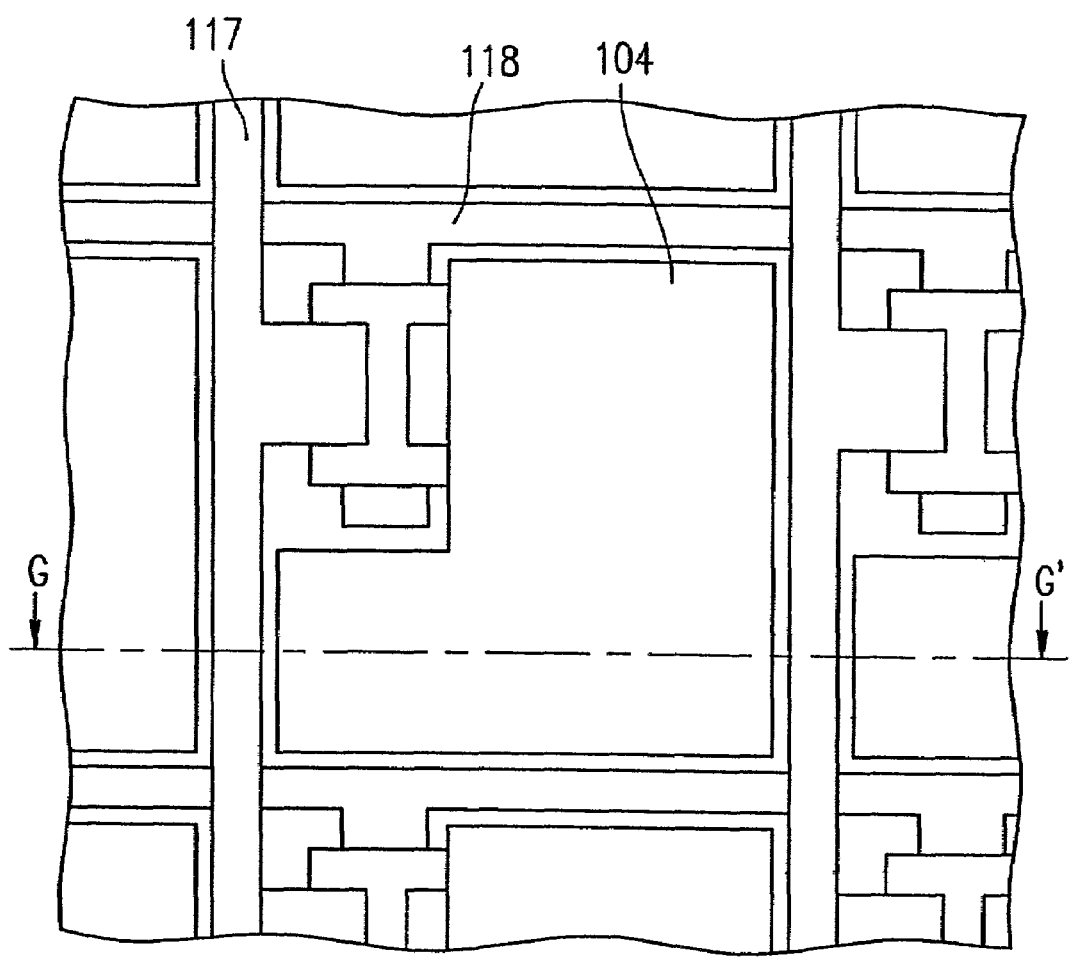
FIG. 16 is a plan view showing a configuration of an element substrate of a general LCD.
Figure 17A:
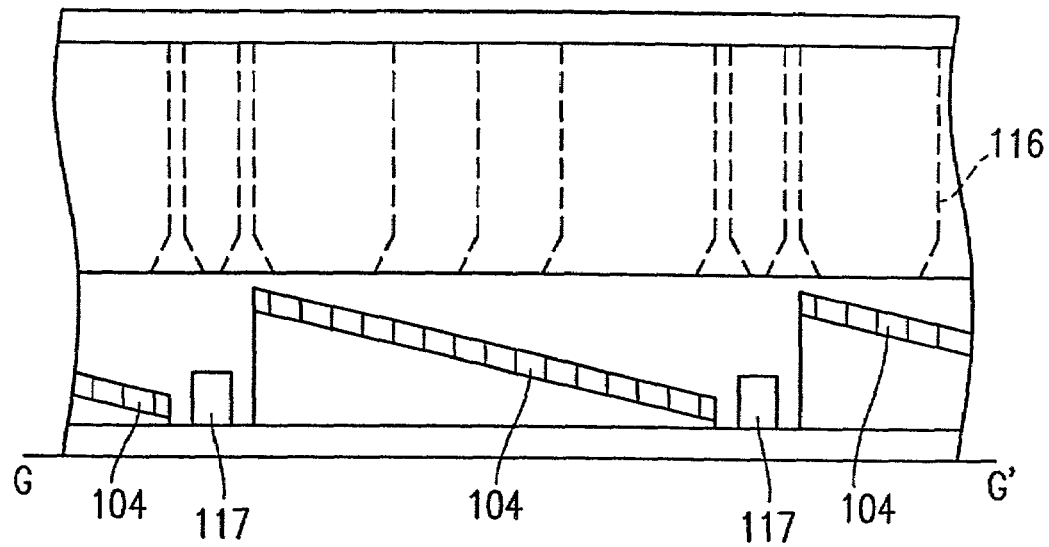
FIGS. 17A and 17B are cross-sectional views for explaining problems with a conventional LCD.
Figure 17B:
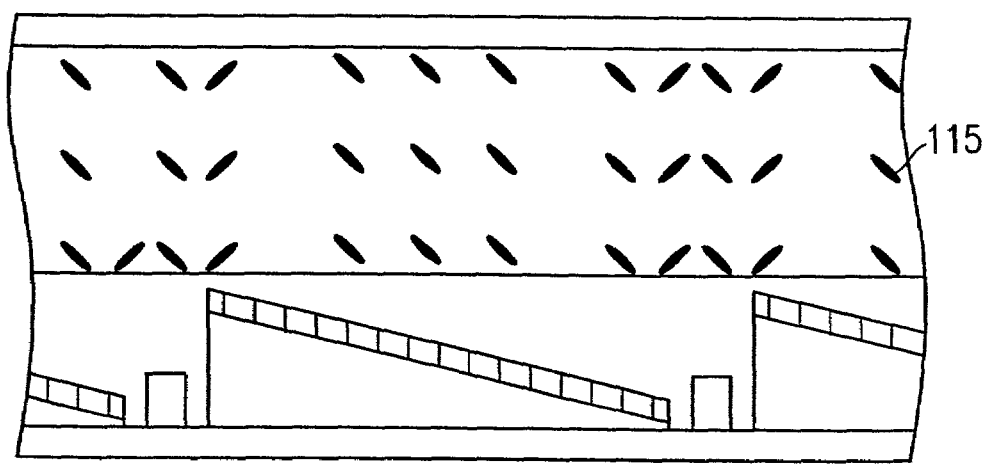

FIG. 12 is a cross-sectional view for explaining a configuration of an LCD 500 according to Example 5 of the present invention. In this LCD 500, a first insulating film comprising protrusions (or pits) is not provided on an element substrate 14a, but pixel electrodes 4a themselves are protrusions (or pits) having tilted surfaces having two or more directions, as is different from Examples 1 to 4.

In the LCD 500, in the element substrate 14a, pixel electrodes 4a having tilted surfaces facing two directions are provided on a glass substrate 1. Further, an insulating film 5a (second insulating film) is provided to bury the protrusions to form a flat upper surface. The pixel electrodes 4a are connected to the drains of TFTs 2 provided on the element substrate 14a. In a counter substrate 13, a color filter 7 and counter electrodes 8 are provided on a glass substrate 6. Vertical alignment films 9 are provided on inner surfaces of the substrates 13 and 14a. A liquid crystal layer 10 having negative dielectric anisotropy is sandwiched between the vertical alignment films 9. Further, polarizers 11 and 12 are provided on outer surfaces of the respective substrates 13 and 14a.

The LCD 500 can be fabricated in a method similar to that of Examples 1 to 4, except for the pixel electrodes in the shape of protrusions having tilted surfaces facing two or more directions. To form the pixel electrodes 4a in the shape of protrusions, pits, or a pit-and-protrusion pattern having tilted surfaces facing two or more directions, first, a powder conductive material is made into gel form, and the material is applied to a substrate. The material is pressed with a mold having a reversed pit-and-protrusion pattern or the like, while it is cured, whereby the reversed pit-and-protrusion pattern is transcribed to the material. Thereafter, the mold is removed, and the pixel electrode is patterned for each pixel.

Alternatively, a metal film made of aluminum or the like may be provided and subjected to dry etching, thereby forming a pit-and-protrusion pattern having tilted surfaces.

In the LCD 500 of Example 5, similar to Examples 1 to 4, liquid crystal molecules in the liquid crystal layer 10 are oriented in each pixel in a direction substantially perpendicular to the substrates 13 and 14a in the absence of an applied voltage, thereby making it possible to provide satisfactory black display. When a voltage less than a voltage which causes the liquid crystal molecules to be parallel to the substrates 13 and 14a is applied between the substrates 13 and 14a, the liquid crystal molecules are regularly oriented to two (or more) predetermined directions regulated by the tilted surfaces facing the two (or more) directions of the pixel electrode 4a. Therefore, the viewing angle dependence problem can be solved.

As described above, according to the present invention, the so-called viewing angle dependence problem where the intensity of transmitted light or hue varies depending on a viewing angle, can be solved. Further, since a pit-and-protrusion pattern at an interface between a liquid crystal layer and a substrate is provided, it is possible to avoid the problem where contrast is reduced in the absence of an applied voltage. As a result, an LCD having satisfactory display quality and a broad viewing angle is achieved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus, comprising:
   a pair of substrates;
   a liquid crystal layer having negative dielectric anisotropy sandwiched by the pair of substrates; and
   a plurality of pixel electrodes each having a peripheral edge disposed in a matrix array on a surface of one of said substrates facing said liquid crystal layer and a counter electrode on a surface of the other of said substrates facing said liquid crystal layer so as to define a plurality of pixels respectively having peripheral edges corresponding to the respective peripheral edges of said pixel electrodes normal to said surfaces of said first and second substrates;
   wherein:
   liquid crystal molecules in the liquid crystal layer of each pixel are oriented in a direction substantially perpendicular to said substrate surfaces in the absence of an applied voltage, are oriented in a direction substantially parallel to said substrate surfaces in the presence of an applied predetermined voltage, and are oriented in a slanting direction with respect to said substrate surfaces in the presence of an applied voltage less than said predetermined voltage;
   wherein:
   at least one of the electrodes of each pixel consists of at least first and second tilted surfaces adjacent to one another and respectively facing directions different from a direction substantially perpendicular to said substrate surfaces;
   wherein:
   an insulating film is provided on a liquid crystal molecule side of said electrodes consisting of at least first and second tilted surfaces to bury said tilted surfaces of said electrodes and define a flat surface substantially parallel to said substrate surfaces; and
   wherein:
   the slanting orientations of substantially all of the liquid crystal molecules in the portion of said liquid crystal layer located in each said pixel under conditions of applied voltage less than said predetermined voltage are regularly regulated to at least first and second predetermined directions different from a direction substantially perpendicular to said substrate surfaces facing said liquid crystal layer by the electrodes of each said pixel that consist of at least first and second tilted surfaces facing in directions different from a direction substantially perpendicular to said substrate surfaces facing said liquid crystal layer.

2. A liquid crystal display apparatus according to claim 1, wherein another insulating film comprising predetermined protrusions, pits, or a pit-and-protrusion pattern having at least first and second tilted surfaces is provided on a substrate side of said electrodes consisting of at least first and second tilted surfaces.

3. A liquid crystal display apparatus according to claim 2, wherein said slanting orientations of said liquid crystal molecules in each pixel are separated by a boundary between said first and second tilted surfaces.

4. A liquid crystal display apparatus according to claim 3, wherein the another insulating film also serves as a vertical alignment film provided by subjecting surfaces of the pair of substrates to vertical alignment treatment.

5. A liquid crystal display apparatus according to claim 2, wherein the another insulating film also serves as a vertical alignment film provided by subjecting surfaces of the pair of substrates to vertical alignment treatment.

6. A liquid crystal display apparatus according to claim 5, wherein:
   each of the electrodes consisting of at least first and second tilted surfaces further consists of at least third and fourth tilted surfaces adjacent to each other and facing directions different from the directions in which said first and second tilted surfaces face and different from the direction substantially perpendicular to the substrate surfaces; and
   a boundary between the first and second tilted surfaces and a boundary between the third and fourth tilted surfaces are oriented to directions different from each other in a plane parallel to the substrate surfaces.

7. A liquid crystal display apparatus according to claim 2, wherein:
   each of the electrodes consisting of at least first and second tilted surfaces further consists of at least third and fourth tilted surfaces adjacent to each other and facing directions different from the directions in which said first and second tilted surfaces face and different from the direction substantially perpendicular to the substrate surfaces; and
   a boundary between the first and second tilted surfaces and a boundary between the third and fourth tilted surfaces are oriented to directions different from each other in a plane parallel to the substrate surfaces.

8. A liquid crystal display apparatus according to claim 1, wherein slanting orientations of said liquid crystal molecules in each pixel are separated by a boundary between said first and second tilted surfaces.

9. A liquid crystal display apparatus according to claim 1, wherein another insulating film serves as a vertical alignment film provided by subjecting surfaces of the pair of substrates to vertical alignment treatment.

10. A liquid crystal display apparatus according to claim 1, wherein:
    each of the electrodes consisting of at least first and second tilted surfaces further consists of at least third and fourth tilted surfaces adjacent to each other and facing directions different from the directions in which said first and second tilted surfaces face and different from the direction substantially perpendicular to the substrate surfaces; and a boundary between the first and second tilted surfaces and a boundary between the third and fourth tilted surfaces are oriented to directions different from each other in a plane parallel to the substrate surfaces.

11. The liquid crystal display apparatus according to claim 1, wherein said first and second tilted electrode surfaces are disposed adjacent to each other so as to form a protrusion, an apex portion of said protrusion faces the liquid crystal layer, and a boundary between said first and second tilted surfaces projects from said insulating film into said liquid crystal layer.

12. A liquid crystal display apparatus according to claim 11, wherein another insulating film serves as a vertical alignment film provided by subjecting surfaces of the pair of substrates to vertical alignment treatment.

13. The liquid crystal display apparatus according to claim 12, wherein said first and second tilted electrode surfaces are disposed adjacent to each other so as to form a protrusion, an apex portion of said protrusion faces the liquid crystal layer, and a boundary between said first and second tilted surfaces projects from said insulating film into said liquid crystal layer.

14. A liquid crystal display apparatus according to claim 11, wherein:

each of the electrodes consisting of at least first and second tilted surfaces further consists of at least third and fourth tilted surfaces adjacent to each other and facing directions different from the directions in which said first and second tilted surfaces face and different from the direction substantially perpendicular to the substrate surfaces; and a boundary between the first and second tilted surfaces and a boundary between the third and fourth tilted surfaces are oriented to directions different from each other in a plane parallel to the substrate surfaces.

* * * * *